United States Patent
Tsukamoto

(10) Patent No.: US 9,857,844 B2
(45) Date of Patent: Jan. 2, 2018

(54) LIGHT-EMITTING DEVICE

(71) Applicant: Semiconductor Energy Laboratory Co., Ltd., Atsugi-shi, Kanagawa-ken (JP)

(72) Inventor: Yosuke Tsukamoto, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 634 days.

(21) Appl. No.: 14/331,453

(22) Filed: Jul. 15, 2014

(65) Prior Publication Data

US 2015/0023030 A1 Jan. 22, 2015

(30) Foreign Application Priority Data

Jul. 22, 2013 (JP) ................................. 2013-151317

(51) Int. Cl.
*G06F 1/16* (2006.01)

(52) U.S. Cl.
CPC ............ *G06F 1/1652* (2013.01); *G06F 1/162* (2013.01); *G06F 1/1618* (2013.01); *G06F 1/1626* (2013.01); *G06F 1/1637* (2013.01)

(58) Field of Classification Search
CPC ...... G06F 1/1615; G06F 1/1618; G06F 1/162; G06F 1/1652
See application file for complete search history.

(56) References Cited

U.S. PATENT DOCUMENTS

| 7,032,984 | B2 | 4/2006 | Kim et al. |
| 7,311,366 | B2 | 12/2007 | Kim et al. |
| 8,477,464 | B2 | 7/2013 | Visser et al. |
| 8,654,095 | B1 * | 2/2014 | Cho ...................... G06F 3/0412 345/173 |
| 8,803,816 | B2 | 8/2014 | Kilpatrick, II et al. |
| 8,836,611 | B2 | 9/2014 | Kilpatrick, II et al. |
| 8,842,425 | B2 | 9/2014 | Ryu |
| 8,860,632 | B2 | 10/2014 | Kilpatrick, II et al. |

(Continued)

FOREIGN PATENT DOCUMENTS

| CN | 001383503 A | 12/2002 |
| CN | 101772943 A | 7/2010 |

(Continued)

OTHER PUBLICATIONS

International Search Report (Application No. PCT/IB2014/063079) dated Nov. 25, 2014.

(Continued)

*Primary Examiner* — Anthony Q Edwards
(74) *Attorney, Agent, or Firm* — Robinson Intellectual Property Law Office; Eric J. Robinson

(57) ABSTRACT

A foldable light-emitting device is provided. Furthermore, a light-emitting device which can be developed is provided. The light-emitting device includes a light-emitting panel having flexibility, two support panels which support the light-emitting panel, and arms which are connected to the respective panels to be rotatable. Furthermore, the light-emitting device has a structure in which the two support panels, which are apart from each other and connected to the two arms that are connected to be rotatable, support the light-emitting panel. Accordingly, the light-emitting device can be folded so that the two support panels are apart from each other.

17 Claims, 11 Drawing Sheets

(56) References Cited

U.S. PATENT DOCUMENTS

| | | |
|---|---|---|
| 8,860,765 B2 | 10/2014 | Kilpatrick, II et al. |
| 8,863,038 B2 | 10/2014 | King et al. |
| 8,866,840 B2 | 10/2014 | Dahl et al. |
| 2002/0104769 A1* | 8/2002 | Kim ................. G06F 1/1601 206/320 |
| 2003/0020701 A1 | 1/2003 | Nakamura et al. |
| 2008/0042940 A1 | 2/2008 | Hasegawa |
| 2010/0060664 A1 | 3/2010 | Kilpatrick, II et al. |
| 2010/0064536 A1* | 3/2010 | Caskey ............... G06F 1/1616 33/303 |
| 2010/0066643 A1* | 3/2010 | King ................. G06F 1/1616 345/1.3 |
| 2010/0085382 A1* | 4/2010 | Lundqvist ........... G06F 1/1616 345/659 |
| 2010/0201604 A1* | 8/2010 | Kee ................... G06F 1/1616 345/1.3 |
| 2010/0208417 A1 | 8/2010 | Visser et al. |
| 2010/0277448 A1 | 11/2010 | Okamoto et al. |
| 2012/0200991 A1 | 8/2012 | Ryu |
| 2012/0217516 A1 | 8/2012 | Hatano et al. |
| 2012/0264489 A1* | 10/2012 | Choi ................. H04M 1/0216 455/566 |
| 2013/0010405 A1* | 1/2013 | Rothkopf ........... H04M 1/0216 361/679.01 |
| 2013/0181955 A1 | 7/2013 | Okamoto et al. |
| 2013/0314611 A1* | 11/2013 | Okutsu ................. H04N 5/64 348/739 |
| 2014/0042293 A1* | 2/2014 | Mok .................. G06F 1/1652 248/682 |
| 2014/0111954 A1* | 4/2014 | Lee ................... G06F 1/1641 361/749 |
| 2014/0226275 A1* | 8/2014 | Ko ................... G06F 1/1626 361/679.27 |
| 2015/0023031 A1 | 1/2015 | Endo |
| 2015/0085433 A1* | 3/2015 | Kim .................. G06F 1/1641 361/679.01 |
| 2016/0103539 A1* | 4/2016 | Jinbo ................. G06F 3/0412 345/173 |
| 2017/0023985 A1* | 1/2017 | Xin .................. G06F 1/1681 |

FOREIGN PATENT DOCUMENTS

| | | |
|---|---|---|
| CN | 102187296 A | 9/2011 |
| CN | 102597904 A | 7/2012 |
| EP | 2479635 A | 7/2012 |
| JP | 2002-006311 A | 1/2002 |
| JP | 2004-507779 | 3/2004 |
| JP | 2006-243621 A | 9/2006 |
| JP | 2010-530553 | 9/2010 |
| JP | 2012-502368 | 1/2012 |
| JP | 2012-190794 | 10/2012 |
| JP | 2013-504783 | 2/2013 |
| KR | 2002-0012881 A | 2/2002 |
| KR | 2010-0049016 A | 5/2010 |
| KR | 2011-0029089 A | 3/2011 |
| KR | 2011-0052743 A | 5/2011 |
| TW | 522775 | 3/2003 |
| TW | 200919398 | 5/2009 |
| TW | 201024976 | 7/2010 |
| WO | WO-02/17051 | 2/2002 |
| WO | WO-2008/153402 | 12/2008 |
| WO | WO-2010/028394 | 3/2010 |
| WO | WO-2010/028397 | 3/2010 |
| WO | WO-2010/028399 | 3/2010 |
| WO | WO-2010/028402 | 3/2010 |
| WO | WO-2010/028403 | 3/2010 |
| WO | WO-2010/028404 | 3/2010 |
| WO | WO-2010/028405 | 3/2010 |
| WO | WO-2010/028406 | 3/2010 |
| WO | WO-2010/028407 | 3/2010 |
| WO | WO-2011/031122 | 3/2011 |

OTHER PUBLICATIONS

Written Opinion (Application No. PCT/IB2014/063079) dated Nov. 25, 2014.

* cited by examiner

FIG. 3A1
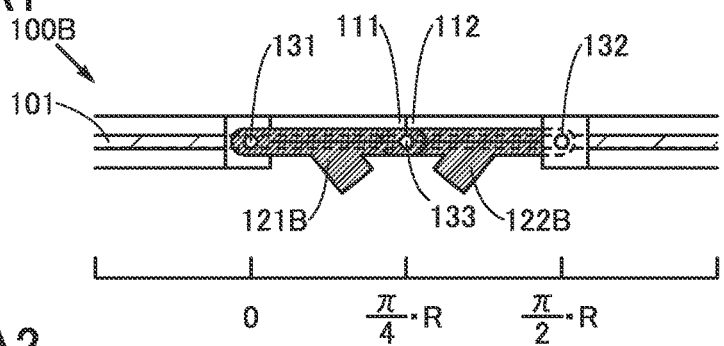
FIG. 3A2
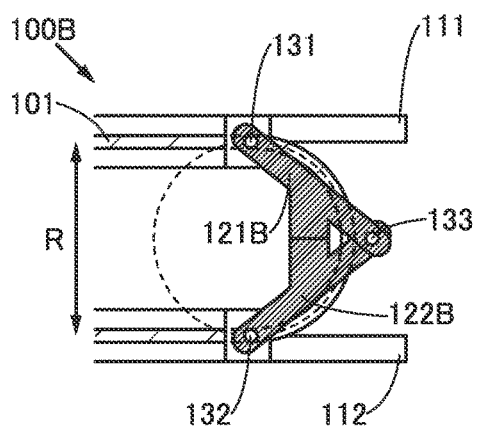
FIG. 3B1
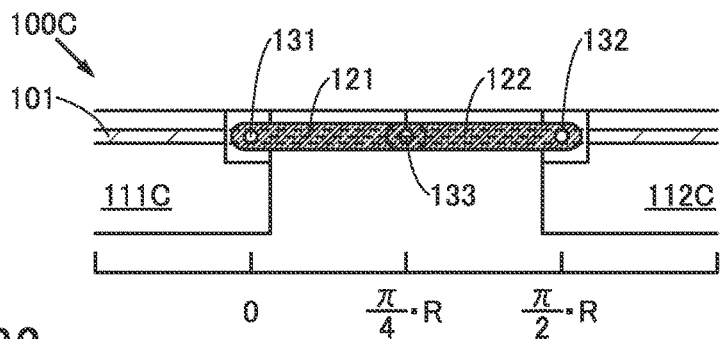
FIG. 3B2
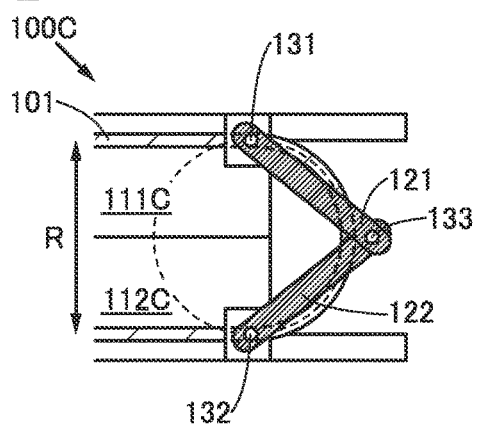

FIG. 5A

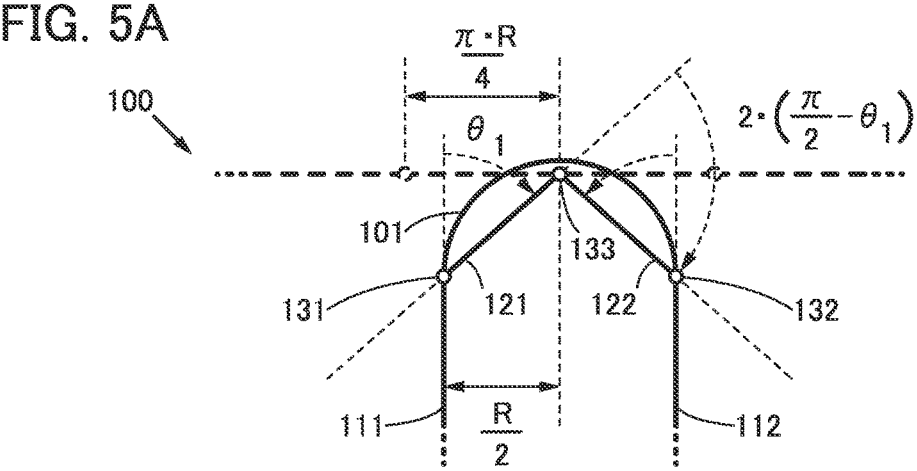

$$\frac{R}{2} = \frac{\pi \cdot R}{4} \cdot \sin \theta_1$$

$$\theta_1 = \sin^{-1}\left(\frac{2}{\pi}\right) \qquad \left(\theta_1 < \frac{\pi}{2}\right)$$

$$2 \cdot \frac{\left(\frac{\pi}{2} - \theta_1\right)}{\theta_1} = \frac{\pi}{\sin^{-1}\left(\frac{2}{\pi}\right)} - 2 \approx 2.55$$

FIG. 5B

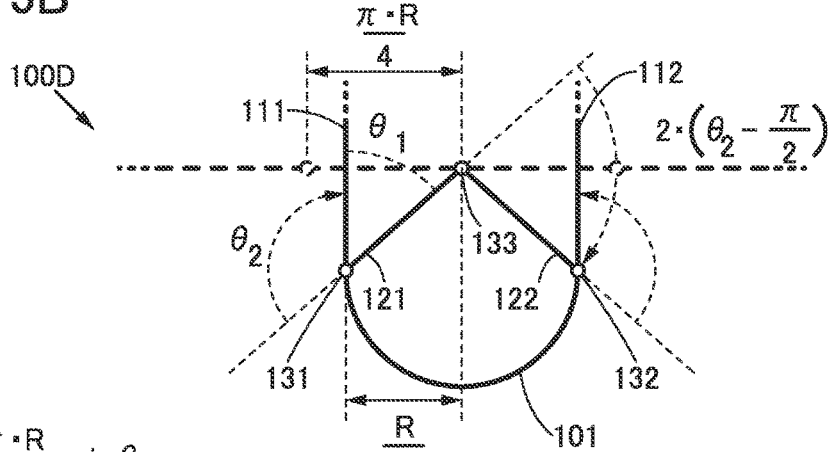

$$\frac{R}{2} = \frac{\pi \cdot R}{4} \cdot \sin \theta_2$$

$$\theta_2 = \pi - \theta_1 = \pi - \sin^{-1}\left(\frac{2}{\pi}\right) \qquad \left(\theta_2 > \frac{\pi}{2}\right)$$

$$2 \cdot \frac{\left(\theta_2 - \frac{\pi}{2}\right)}{\theta_2} = 2 \cdot \frac{\left(\frac{\pi}{2} - \theta_1\right)}{\pi - \theta_1} = 1 - \frac{\theta_1}{\pi - \theta_1} = 1 - \frac{\pi}{\pi - \sin^{-1}\left(\frac{2}{\pi}\right)} \approx 0.72$$

FIG. 6A
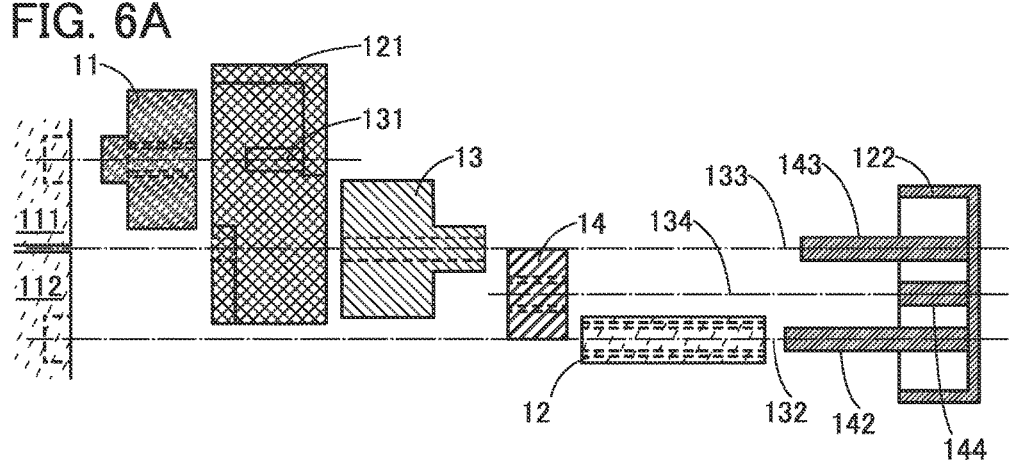
FIG. 6B1　　FIG. 6B2　　FIG. 6B3
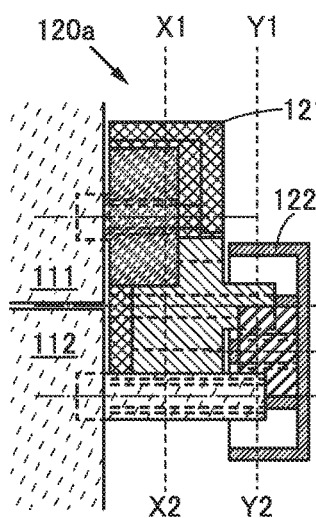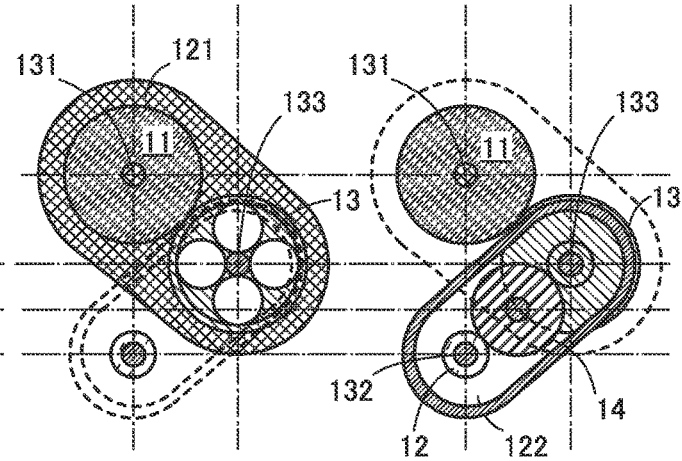
FIG. 6C
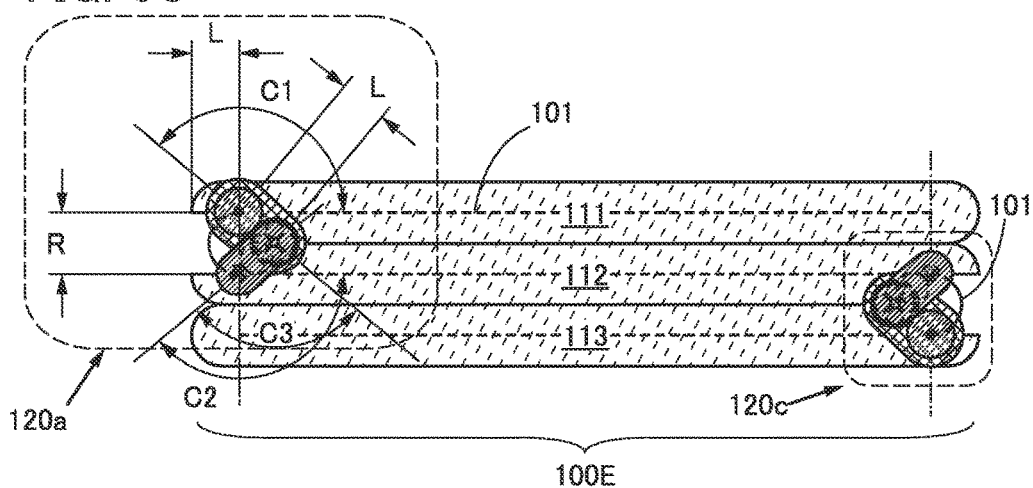

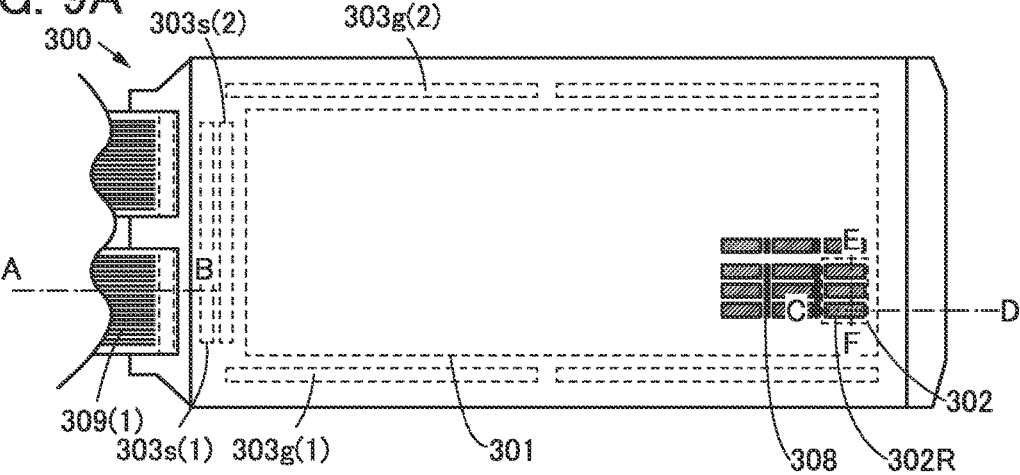
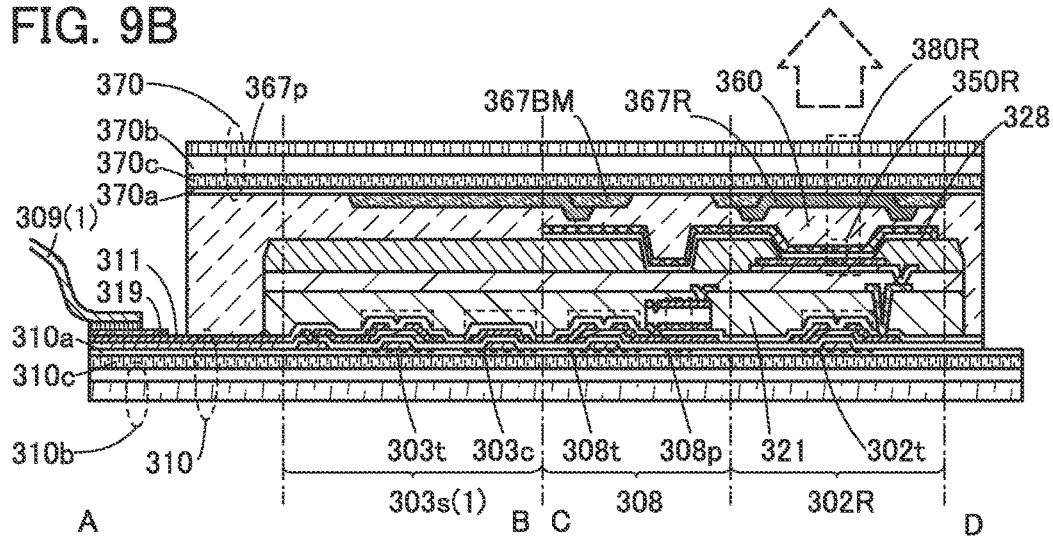
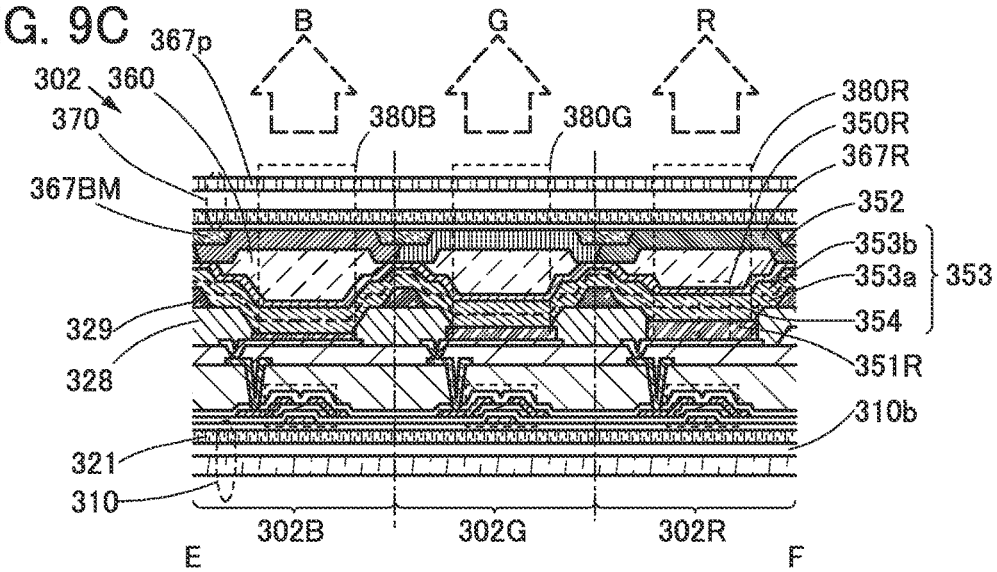

LIGHT-EMITTING DEVICE

TECHNICAL FIELD

The present invention relates to an object, a method, or a manufacturing method. In addition, the present invention relates to a process, a machine, manufacture, or a composition of matter. In particular, the present invention relates to, for example, a semiconductor device, a display device, a light-emitting device, a power storage device, a driving method thereof, or a manufacturing method thereof. In particular, the present invention relates to a light-emitting device.

BACKGROUND ART

The social infrastructures relating to means for transmitting information have advanced. This has made it possible to acquire, process, and send out many pieces and various kinds of information with the use of an information processor not only at home or office but also at other visiting places.

With this being the situation, portable information processors are under active development.

For example, portable information processors are often used outdoors, and force might be accidentally applied by dropping to the information processors and display devices included in them. As an example of a display device that is not easily broken, a display device having high adhesiveness between a structure body by which a light-emitting layer is divided and a second electrode layer is known (Patent Document 1).

REFERENCE

Patent Document

[Patent Document 1] Japanese Published Patent Application No. 2012-190794

DISCLOSURE OF INVENTION

An object of one embodiment of the present invention is to provide a foldable light-emitting device. Another object is to provide a light-emitting device which can be developed.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is a light-emitting device including a light-emitting panel having flexibility, a first support panel supporting the light-emitting panel, a second support panel supporting the light-emitting panel, and a hinge portion connecting the first support panel and the second support panel so that the light-emitting device is foldable. The hinge portion includes a first arm connected to be rotatable about a first shaft and a second arm connected to be rotatable about a second shaft. The first arm and the second arm are connected to be rotatable about a third shaft, and the light-emitting panel is folded in the state where part of the light-emitting panel is apart from another part of the light-emitting panel.

One embodiment of the present invention is a light-emitting device including a light-emitting panel having flexibility, a first support panel supporting the light-emitting panel, a second support panel supporting the light-emitting panel, a third support panel supporting the light-emitting panel, a first hinge portion and a second hinge portion connecting the first support panel and the second support panel so that the light-emitting device is foldable, and a third hinge portion and a fourth hinge portion connecting the second support panel and the third support panel so that the light-emitting device is foldable. The first hinge portion and the second hinge portion include a first arm connected to be rotatable about a first shaft, and a second arm connected to be rotatable about a second shaft. The first arm and the second arm are connected to be rotatable about a third shaft. The third hinge portion and the fourth hinge portion include a third arm connected to be rotatable about a fourth shaft, and a fourth arm connected to be rotatable about a fifth shaft. The third arm and the fourth arm are connected to be rotatable about a sixth shaft, and the light-emitting panel is folded in the state where part of the light-emitting panel is apart from another part of the light-emitting panel.

The light-emitting device of one embodiment of the present invention includes the light-emitting panel having flexibility, the two support panels which support the light-emitting panel, and the arms which are connected to the respective panels to be rotatable. Furthermore, the light-emitting device has a structure in which the two support panels, which are apart from each other and connected to the two arms that are connected to be rotatable, support the light-emitting panel. Accordingly, the light-emitting device can be folded so that the two support panels are apart from each other. As a result, a foldable light-emitting device can be provided. In addition, a light-emitting device which can be developed can be provided.

One embodiment of the present invention is the light-emitting device in which a distance from the first shaft to the third shaft is equal to a distance from the second shaft to the third shaft in the first hinge portion.

One embodiment of the present invention is the light-emitting device in which a distance from the first shaft to the third shaft, a distance from the second shaft to the third shaft, a distance from the first shaft to one end portion of the first support panel, and a distance from the second shaft to one end portion of the second support panel are equal to one another in the first hinge portion.

When the light-emitting device of one embodiment of the present invention is developed, the end portion of the first support panel comes in contact with the end portion of the second support panel. Therefore, the light-emitting device can be folded so that the two support panels are apart from each other and can be developed into a flat-plate-like shape. As a result, a foldable light-emitting device can be provided. Furthermore, a light-emitting device which can be developed can be provided.

In one embodiment of the present invention, a distance from the first shaft to the third shaft, a distance from the second shaft to the third shaft, a distance from the first shaft to one end portion of the first support panel, and a distance from the second shaft to one end portion of the second support panel are each $\pi \cdot R/4$ in the first hinge portion, and the light-emitting device is folded so that the first support panel and the second support panel face each other, and a distance from the first shaft to the second shaft is R. Note that $\pi$ represents the circular constant.

When the light-emitting device of one embodiment of the present invention is developed, the end portion of the first support panel comes in contact with the end portion of the second support panel. Furthermore, the length of a curve which passes through the first shaft and the second shaft is π·R/2 and the curvature radius of the curve is larger than R/2. Therefore, the light-emitting panel can be folded between the two support panels that are apart from each other, with a curvature radius of larger than R/2. Furthermore, tensile stress or compressive stress which is applied to the light-emitting panel when the two support panels are developed into a flat-plate-like shape can be relieved. As a result, a foldable light-emitting device can be provided. Furthermore, a light-emitting device which can be developed can be provided.

In the light-emitting device of one embodiment of the present invention, a distance from the first shaft to the third shaft and a distance from the second shaft to the third shaft are each π·R/4 in the first hinge portion. The first arm is rotated about the first shaft at an angular velocity of ω, and the second arm is rotated about the second shaft at an angular velocity of −ω and rotated about the third shaft at an angular velocity of greater than or equal to 2.4ω and less than or equal to 2.6ω. The light-emitting device is folded so that the first support panel and the second support panel face each other, and a distance from the first shaft to the second shaft is R.

In the light-emitting device of one embodiment of the present invention, a distance from the first shaft to the third shaft and a distance from the second shaft to the third shaft are each π·R/4 in the first hinge portion. The first arm is rotated about the first shaft at an angular velocity of ω, and the second arm is rotated about the second shaft at an angular velocity of −ω and rotated about the third shaft at an angular velocity of greater than or equal to 0.71ω and less than or equal to 0.73ω. The light-emitting device is folded so that the first support panel and the second support panel face each other, and a distance from the first shaft to the second shaft is R.

In the light-emitting device of one embodiment of the present invention, the first arm and the second arm are rotated inversely at the same velocity to control the distance between the first shaft and the second shaft. In this manner, the light-emitting panel can be folded between the two support panels apart from each other, with a curvature radius of greater than R/2. Furthermore, the two support substrates supporting the light-emitting panel can be developed at the same velocity. As a result, a foldable light-emitting device can be provided. Furthermore, a light-emitting device which can be developed can be provided.

According to one embodiment of the present invention, a foldable light-emitting device can be provided. In addition, a light-emitting device which can be developed can be provided.

BRIEF DESCRIPTION OF DRAWINGS

FIGS. 3A1 to 3B2 each illustrate the structure of a hinge portion of a light-emitting device according to one embodiment.

FIGS. 5A and 5B each illustrate movement of a hinge portion of a light-emitting device according to one embodiment.

FIGS. 6A to 6C illustrate the structure of a hinge portion of a light-emitting device according to one embodiment.

FIGS. 9A to 9C illustrate the structure of an input/output device that can be used for an information processor according to one embodiment.

BEST MODE FOR CARRYING OUT THE INVENTION

Figure 1A:
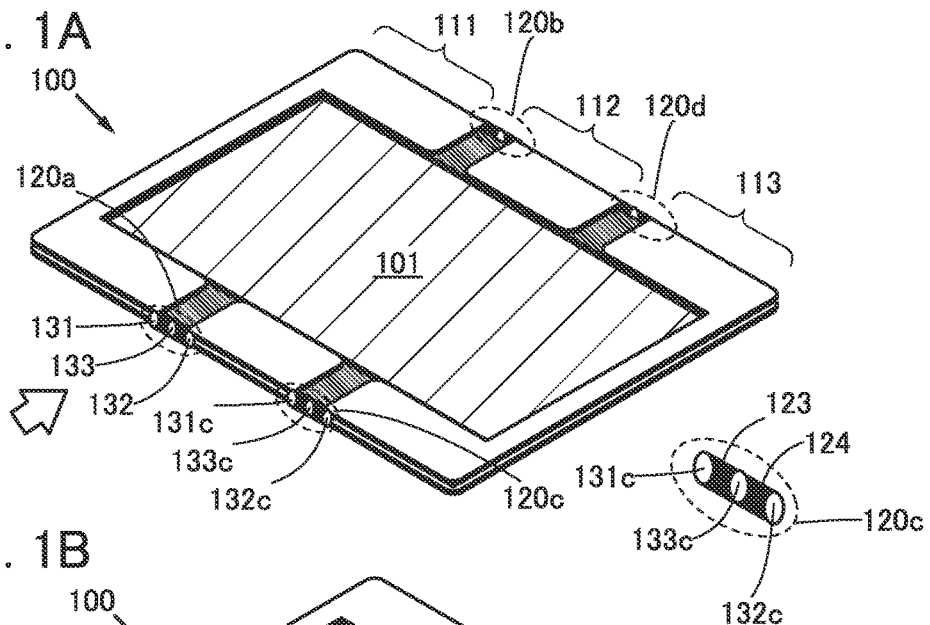
FIGS. 1A to 1C are perspective views illustrating the structure of a light-emitting device according to one embodiment.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below. Note that in the structures of the invention described below, the same portions or portions having similar functions are denoted by the same reference numerals in different drawings, and description of such portions is not repeated.

(Embodiment 1)

In this embodiment, the structure of a light-emitting device 100 of one embodiment of the present invention is described with reference to FIGS. 1A to 1C, FIGS. 2A to 2C, FIGS. 3A1 to 3B2, and FIGS. 4A to 4C.

Figure 1B:
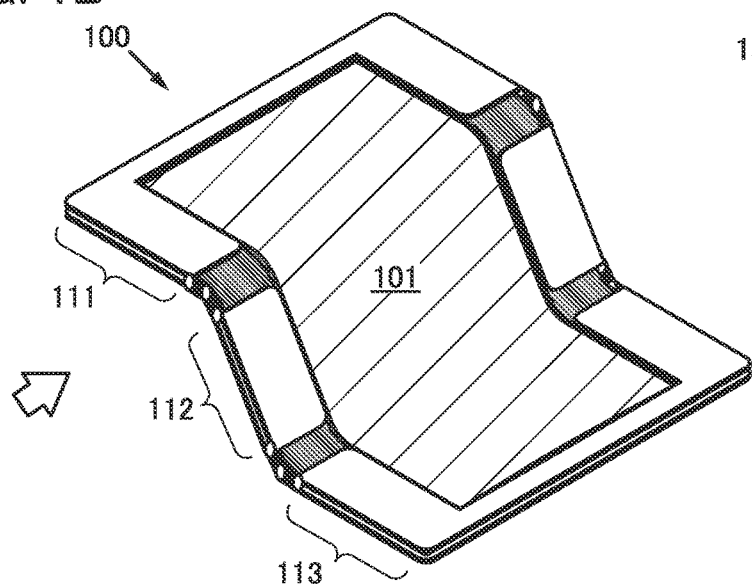
Figure 1C:
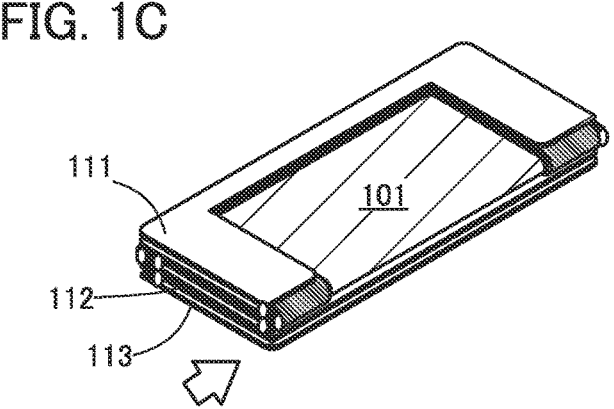

FIGS. 1A to 1C are perspective views illustrating the structure of a light-emitting device 100 of one embodiment of the present invention. FIG. 1A illustrates the light-emitting device 100 in a developed state, FIG. 1B illustrates the light-emitting device 100 of FIG. 1A in a bent state, and FIG. 1C illustrates the light-emitting device 100 of FIG. 1A in a folded state.

Figure 2A:
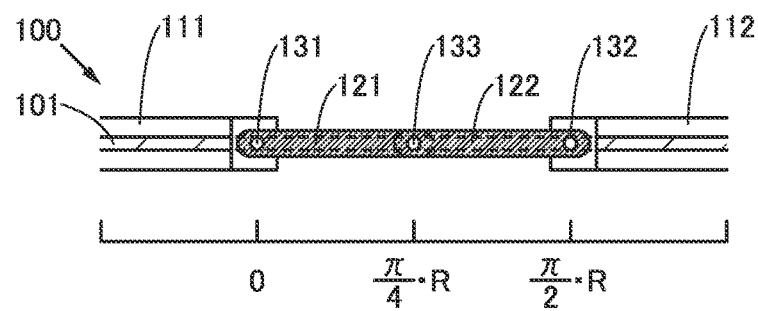
FIGS. 2A to 2C illustrate the structure of a hinge portion of a light-emitting device according to one embodiment.
Figure 2B:
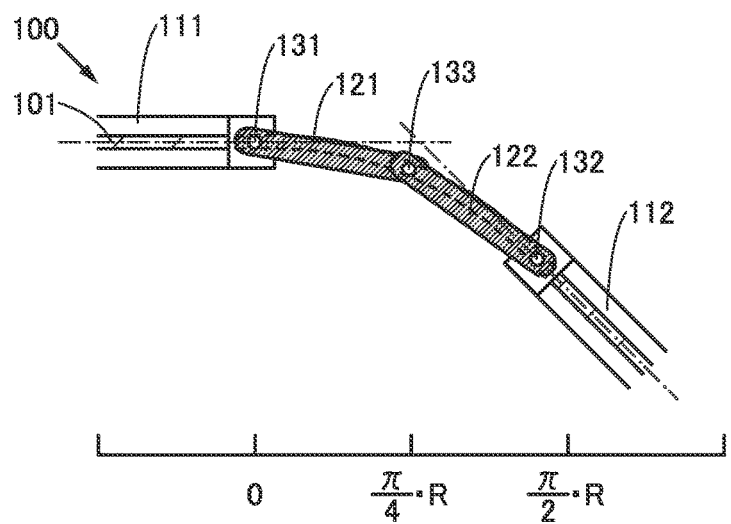
Figure 2C:
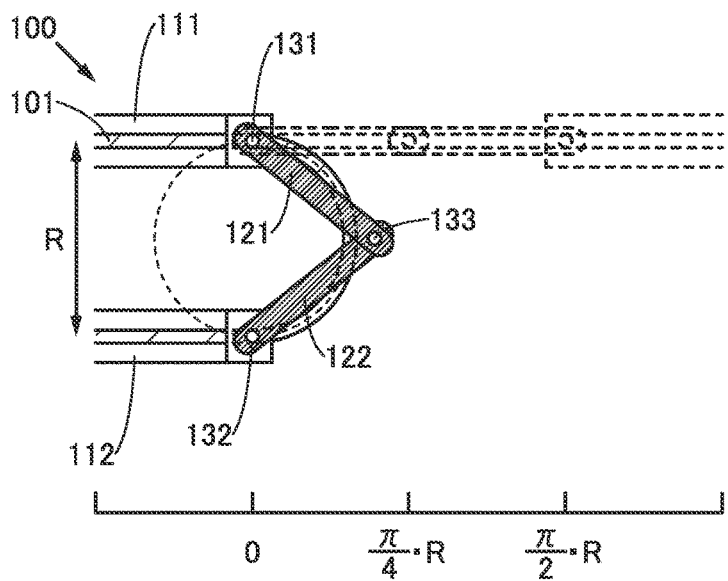

FIGS. 2A to 2C are side views each illustrating the state of a hinge portion of the light-emitting device 100 of one embodiment of the present invention. FIG. 2A is a side view illustrating the structure of the hinge portion of the light-emitting device 100 in a developed state, FIG. 2B is a side view illustrating the structure of the hinge portion of the light-emitting device 100 in a bent state, and FIG. 2C is a side view illustrating the structure of the hinge portion of the light-emitting device 100 in a folded state.

FIGS. 3A1 to 3B2 are side views illustrating a hinge portion of each of a light-emitting device 100B and a light-emitting device 100C of one embodiment of the present invention.

The light-emitting device 100 described in this embodiment includes a light-emitting panel 101 having flexibility; a first support panel 111 which supports the light-emitting panel 101; a second support panel 112 which supports the light-emitting panel 101; a third support panel 113 which supports the light-emitting panel 101; a first hinge portion 120*a* and a second hinge portion 120*b* which connect the first support panel 111 and the second support panel 112 so that the light-emitting device 100 can be folded; and a third hinge portion 120*c* and a fourth hinge portion 120*d* which connect the second support panel 112 and the third support panel 113 so that the light-emitting device 100 can be folded (see FIGS. 1A to 1C).

The first hinge portion 120a and the second hinge portion 120b include a first arm 121 which is connected so as to be rotatable about a first shaft 131, and a second arm 122 which is connected so as to be rotatable about a second shaft 132 (see FIG. 1A and FIG. 2A). The first arm 121 and the second arm 122 are connected so as to be rotatable about a third shaft 133.

The third hinge portion 120c and the fourth hinge portion 120d include a third arm 123 which is connected so as to be rotatable about a fourth shaft 131c, and a fourth arm 124 which is connected so as to be rotatable about a fifth shaft 132c. The third arm 123 and the fourth arm 124 are connected so as to be rotatable about a sixth shaft 133c (see FIG. 1A).

The light-emitting panel 101 is folded so that a first part of the light-emitting panel 101 is not in contact with a second part thereof and a space is provided between the first part and the second part (see FIGS. 2A to 2C).

In the light-emitting device 100, a distance from the first shaft 131 to the third shaft 133 is equal to a distance from the second shaft 132 to the third shaft 133 (see FIG. 2A).

Specifically, the distance from the first shaft 131 to the third shaft 133 and the distance from the second shaft 132 to the third shaft 133 are each $\pi \cdot R/4$. Note that in this embodiment, R can be regarded as a distance from the first shaft 131 to the second shaft 132 in a folded state (see FIG. 2C).

The light-emitting device 100 described in this embodiment includes the light-emitting panel 101 having flexibility, the two support panels which support the light-emitting panel 101, and the arms which are connected to the respective panels to be rotatable. The light-emitting device 100 has a structure in which the two support panels, which are apart from each other and connected to the two arms that are connected to be rotatable, support the light-emitting panel. Accordingly, the light-emitting device 100 can be folded so that the two support panels are apart from each other. As a result, a foldable light-emitting device can be provided. In addition, a light-emitting device which can be developed can be provided.

The light-emitting device 100 includes the first hinge portion 120a and the second hinge portion 120b which is provided in a position facing the first hinge portion 120a (see FIG. 1A). The first hinge portion 120a and the second hinge portion 120b connect the first support panel 111 and the second support panel 112 so that the light-emitting device 100 can be bent at the first hinge portion 120a and the second hinge portion 120b (see FIGS. 1B and 1C).

The light-emitting device 100 includes the third hinge portion 120c and the fourth hinge portion 120d which is provided in a position facing the third hinge portion 120c (see FIG. 1A). The third hinge portion 120c and the fourth hinge portion 120d connect the second support panel 112 and the third support panel 113 so that the light-emitting device 100 can be bent at the third hinge portion 120c and the fourth hinge portion 120d (see FIGS. 1B and 1C).

For example, a hinge portion which has the same structure as the first hinge portion 120a can be used as the second hinge portion 120b, the third hinge portion 120c, and the fourth hinge portion 120d. The four hinge portions having the same structure facilitate folding the light-emitting device 100 into equal-sized parts.

The light-emitting device 100 includes the first to third support panels 111 to 113, which are connected with the foldable hinge portions. Accordingly, the light-emitting device 100 can be folded into three parts.

The following describes individual components included in the light-emitting device of one embodiment of the present invention.

<<Light-Emitting Panel>>

The light-emitting panel 101 has flexibility and includes one or more light-emitting elements. The light-emitting elements may emit light at the same time or emit light independently.

Note that structures applicable to the light-emitting panel 101 are described in detail in Embodiments 4 and 5.

<<Support Panel>>

The first support panel 111, the second support panel 112, and the third support panel 113 support the light-emitting panel 101.

For example, as the structure in which the support panel supports the light-emitting panel 101, the following structures are applicable: a structure in which a plate-like member is attached to the light-emitting panel 101 to support the light-emitting panel 101; and a structure in which the light-emitting panel 101 is provided between two plate-like members.

Note that one embodiment of the present invention is not limited to the structure in which the light-emitting panel 101 is integrated with the support panel.

For example, the support panel may have a space therein so that the light-emitting panel 101 can be slid at the time of folding operation of the light-emitting device 100.

The first shaft 131 is provided on a side surface of the first support panel 111, and the second shaft 132 is provided on a side surface of the second support panel 112.

<<Arm>>

The first arm 121 is provided with a bearing which bears the first shaft 131, and the second arm 122 is provided with a bearing which bears the second shaft 132. Furthermore, the first arm 121 and the second arm 122 are provided with a bearing so as to be rotated about the third shaft 133. Thus, the first arm 121 and the second arm 122 form the first hinge portion 120a.

<Modification Example 1>

A modification example of this embodiment is described with reference to FIGS. 3A1 to 3B2.

FIGS. 3A1 to 3B2 are side views illustrating the structure of a hinge portion of each of the light-emitting device 100B and the light-emitting device 100C of one embodiment of the present invention.

FIG. 3A1 is a side view illustrating the structure of a hinge portion of the light-emitting device 100B in a developed state, and FIG. 3A2 is a side view illustrating the structure of the hinge portion of the light-emitting device 100B in a folded state.

FIG. 3B1 is a side view illustrating the structure of a hinge portion of the light-emitting device 100C in a developed state, and FIG. 3B2 is a side view illustrating the structure of the hinge portion of the light-emitting device 100C in a folded state.

In the light-emitting device 100B described in the modification example of this embodiment, a distance from the first shaft 131 to the third shaft 133, a distance from the second shaft 132 to the third shaft 133, a distance from the first shaft 131 to one end portion of the first support panel 111, and a distance from the second shaft 132 to one end portion of the second support panel 112 are equal to one another (see FIGS. 3A1 and 3A2).

When the light-emitting device 100B of the modification example of this embodiment is developed, the end portion of the first support panel 111 comes in contact with the end portion of the second support panel 112. Therefore, the light-emitting device 100B can be folded so that the two support panels are apart from each other (see FIG. 3A2) and can be developed into a flat-plate-like shape (see FIG. 3A1). As a result, a foldable light-emitting device can be provided. Furthermore, a light-emitting device which can be developed can be provided.

In the light-emitting device 100B described in the modification example of this embodiment, the distance from the first shaft 131 to the third shaft 133, the distance from the second shaft 132 to the third shaft 133, the distance from the first shaft 131 to the end portion of the first support panel 111, and the distance from the second shaft 132 to the end portion of the second support panel 112 are equal to one another, i.e., π·R/4 (see FIG. 3A1).

Furthermore, the light-emitting device 100B is folded so that the first support panel 111 and the second support panel 112 face each other and a distance from the first shaft 131 to the second shaft 132 is R (see FIG. 3A2).

Specifically, a stopper is provided in each of the first arm 121B and the second arm 122B. Accordingly, the distance from the first shaft 131 to the second shaft 132 cannot be shorter than R.

In the light-emitting device 100C described in the modification example of this embodiment, the distance from the first shaft 131 to the third shaft 133, the distance from the second shaft 132 to the third shaft 133, the distance from the first shaft 131 to the end portion of a first support panel 111C, and the distance from the second shaft 132 to the end portion of a second support panel 112C are equal to one another, i.e., π·R/4 (see FIG. 3B1).

Furthermore, the light-emitting device 100C can folded so that the first support panel 111C and the second support panel 112C face each other and a distance from the first shaft 131 to the second shaft 132 is R (see FIG. 3B2)

Specifically, each thickness of the first support panel 111C and the second support panel 112C is large enough so that the distance from the second shaft 132 to the first shaft 131 is not shorter than R.

When the light-emitting device 100C described in the modification example of this embodiment is developed, the end portion of the first support panel 111 comes in contact with the end portion of the second support panel 112. Furthermore, the length of a curve which passes through the first shaft 131 and the second shaft 132 is π·R/2 and the curvature radius of the curve is larger than R/2. Therefore, the light-emitting panel 101 can be folded between the first support panel 111 and the second support panel 112 that are apart from each other, with a curvature radius of larger than R/2. Furthermore, tensile stress or compressive stress which is applied to the light-emitting panel 101 when the first support panel 111 and the second support panel 112 are developed into a flat-plate-like shape can be relieved. As a result, a foldable light-emitting device can be provided. Furthermore, a light-emitting device which can be developed can be provided.

<Modification example 2>

A modification example of this embodiment is described with reference to FIGS. 4A to 4C.

Figure 4A:
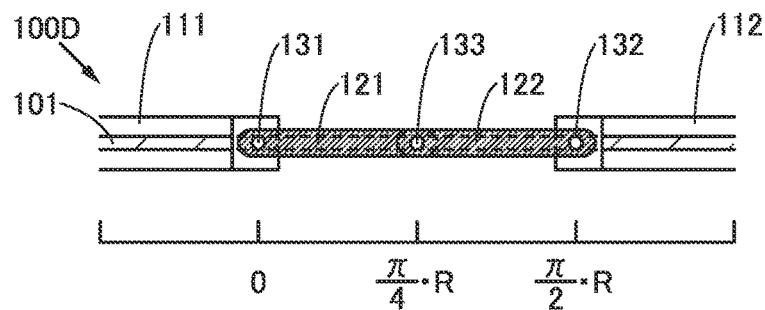
FIGS. 4A to 4C illustrate the structure of a hinge portion of a light-emitting device according to one embodiment.
Figure 4B:
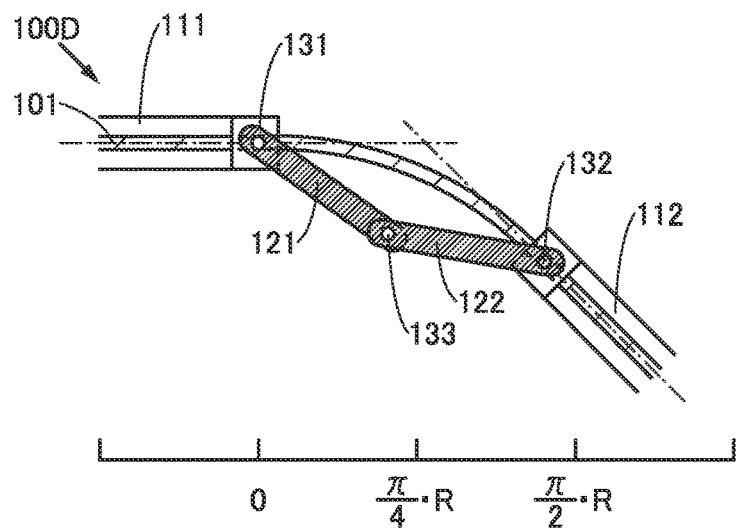
Figure 4C:
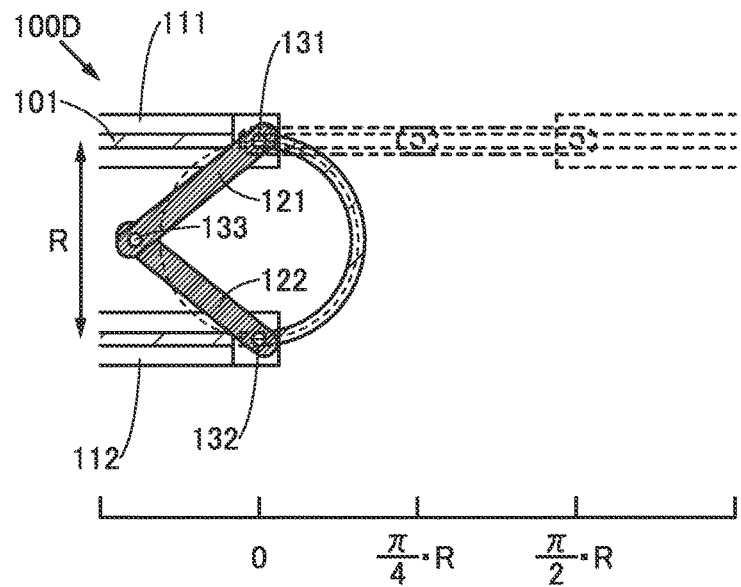

FIGS. 4A to 4C are side views illustrating the structure of a hinge portion of a light-emitting device 100D of one embodiment of the present invention.

FIG. 4A illustrates a hinge portion of the light-emitting device 100D in a developed state, FIG. 4B illustrates the hinge portion of the light-emitting device 100D in a bent state, and FIG. 4C illustrates the hinge portion of the light-emitting device 100D in a folded state.

The light-emitting device 100D is different from the light-emitting device 100 described using FIGS. 2A to 2C in that the first arm 121 and the second arm 122 are folded between the first support panel 111 and the second support panel 112. The other structures of the light-emitting device 100D are the same as those of the light-emitting device 100.

This embodiment can be combined with any of the other embodiments in this specification as appropriate.

Embodiment 2)

In this embodiment, the structure of a hinge portion applicable to the light-emitting device 100 of one embodiment of the present invention is described with reference to FIGS. 5A and 5B.

FIGS. 5A and 5B are each a schematic diagram illustrating the movement of the hinge portion of the light-emitting device 100 of one embodiment of the present invention. Note that to easily understand the movement of the hinge portion, the structure in the figure is simplified.

FIG. 5A is a schematic diagram illustrating the movement of the hinge portion of the light-emitting device 100 described using FIGS. 2A to 2C.

FIG. 5B is a schematic diagram illustrating the movement of the hinge portion of the light-emitting device 100D described using FIGS. 4A to 4C.

In the hinge portion of the light-emitting device 100 described in this embodiment, a distance from the first shaft 131 to the third shaft 133, and a distance from the second shaft 132 to the third shaft 133 are each π·R/4 (see FIG. 5A).

Note that a thick solid line represents the first arm 121 and the second arm 122 in a folded state, and a thick dashed line represents the first arm 121 and the second arm 122 in a developed state. Furthermore, a thick solid line represents the light-emitting panel 101 having flexibility in a folded state, and a thick dotted line represents the light-emitting panel 101 in a developed state.

The first arm 121 is rotated about the first shaft 131 by an angle $\theta_1$ at an angular velocity of $\omega$. The second arm 122 is rotated about the second shaft 132 at an angular velocity of $-\omega$ and rotated about the third shaft 133 at an angular velocity of greater than or equal to $2.4\omega$ and less than or equal to $2.6\omega$.

Then, the light-emitting device 100 is folded so that the first support panel 111 and the second support panel 112 face each other and the distance from the first shaft 131 to the second shaft 132 is R.

In the hinge portion of the light-emitting device 100D described in this embodiment, a distance from the first shaft 131 to the third shaft 133, and a distance from the second shaft 132 to the third shaft 133 are each π·R/4 (see FIG. 5B).

The first arm 121 is rotated about the first shaft 131 by an angle (a at an angular velocity of $\omega$. The second arm 122 is rotated about the second shaft 132 at an angular velocity of $-\omega$ and rotated about the third shaft 133 at an angular velocity of greater than or equal to $0.71\omega$ and less than or equal to $0.73\omega$.

Then, the light-emitting device 100D is folded so that the first support panel 111 and the second support panel 112 face each other and the distance from the first shaft 131 to the second shaft 132 is R.

In the light-emitting device of one embodiment of the present invention, the first arm 121 and the second arm 122 are rotated inversely at the same angular velocity to control the distance between the first shaft 131 and the second shaft 132. In this manner, the light-emitting panel 101 can be folded between the two support panels apart from each other, with a curvature radius of greater than R/2. Furthermore, the two support substrates supporting the light-emitting panel 101 can be developed at the same velocity. As a result, a foldable light-emitting device can be provided. Furthermore, a light-emitting device which can be developed can be provided.

For example, the light-emitting panel 101, which is broken when the curvature radius is less than R/2, can be folded so that the curvature radius is not less than R/2 in the light-emitting device of one embodiment of the present invention.

The movement of a hinge portion when the light-emitting device of one embodiment of the present invention is changed from the developed state to the folded state is described.

Specifically, the following movement is described: the light-emitting device is developed so that the distance between the first shaft 131 and the second shaft 132 is π·R/2, and then the light-emitting device is folded in such a manner that the light-emitting panel 101 in a flat state (see a thick dashed line in FIGS. 5A and 5B) is bent into an arc-like shape drawing a half circle passing through the first shaft 131 and the second shaft 132, by moving the first shaft 131 and the second shaft 132 so that the distance between the first shaft 131 and the second shaft 132 is R. Thus, the light-emitting panel 101 can be folded so that the curvature radius is not less than R/2 (see the thick lines in FIGS. 5A and 5B).

<<Movement of Light-Emitting Device 100 for Folding Light-Emitting Panel 101>>

The first arm 121 is rotated about the first shaft 131 by the angle $\theta_1$ from the first support panel 111. Accordingly, the first arm 121 is bent by the angle $\theta_1$ from the first support panel 111.

The second arm 122 is rotated about the second shaft 132 by an angle $-\theta_1$ from the second support panel 112. Accordingly, the second arm 122 is bent by the angle $-\theta_1$ from the second support panel 112.

Furthermore, the first arm 121 is rotated about the third shaft 133 by an angle of $-((\pi/2)-\theta_1)$, and the second arm 122 is rotated about the third shaft 133 by an angle of $((\pi/2)-\theta_1)$. In other words, the second arm 122 is rotated about the third shaft 133 with respect to the first arm 121 by an angle of $2 \cdot ((\pi/2)-\theta_1)$.

Note that when a value of the following formula (1) is applied to $\theta_1$, the folded state can be expressed.

In addition, the first arm 121 is rotated about the first shaft 131 by an angle of $\theta_1$ at an angular velocity of ω, and the second arm 122 is rotated about the second shaft 132 at an angular velocity of -ω. Then, the second arm is rotated about the third shaft 133 at an angular velocity of greater than or equal to 2.4ω and less than or equal to 2.6ω with respect to the first arm, whereby the light-emitting panel 101 can be folded so that the curvature radius of the light-emitting panel 101 is not less than R/2 in the folding movement.

Note that an optimal ratio of the angular velocity of the second arm with respect to the first arm to the angular velocity of the first arm can be obtained from the following formula (2).

$$\theta_1 = \sin^{-1}\left(\frac{2}{\pi}\right) \tag{1}$$

$$\frac{\pi}{\sin^{-1}\left(\frac{2}{\pi}\right)} - 2 \tag{2}$$

Note that in the formula (1), $\theta_1$ is less than π/2 and, specifically, is approximately 40°.

Thus, the light-emitting panel 101 can be folded so that the first support panel 111 faces the second support panel 112.

<<Movement of Light-Emitting Device 100D for Folding Light-Emitting Panel 101>>

The first arm 121 is rotated about the first shaft 131 by the angle $\theta_2$ from the first support panel 111. Accordingly, the first arm 121 is bent by the angle $\theta_2$ from the first support panel 111.

The second arm 122 is rotated about the second shaft 132 by an angle $-\theta_2$ from the second support panel 112. Accordingly, the second arm 122 is bent by the angle $-\theta_2$ from the second support panel 112.

Furthermore, the first arm 121 is rotated about the third shaft 133 by an angle of $-(\theta_2-(\pi/2))$, and the second arm 122 is rotated about the third shaft 133 by an angle of $(\theta_2-(\pi/2))$. In other words, the second arm 122 is rotated about the third shaft 133 with respect to the first arm 121 by an angle of $2 \cdot (\theta_2-(\pi/2))$.

Note that when a value of the following formula (3) is applied to $\theta_2$, the folded state can be expressed. Note that $\theta_2$ is obtained by subtracting $\theta_1$ from π.

In addition, the first arm 121 is rotated about the first shaft 131 by an angle of $\theta_2$ at an angular velocity of ω, and the second arm 122 is rotated about the second shaft 132 at an angular velocity of -ω. Then, the second arm 122 is rotated about the third shaft 133 at an angular velocity of greater than or equal to 0.710ω and less than or equal to 0.73ω with respect to the first arm 121, whereby the light-emitting panel 101 can be folded so that the curvature radius of the light-emitting panel 101 is not less than R/2 in the folding movement.

Note that an optimal ratio of the angular velocity of the second arm with respect to the first arm to the angular velocity of the first arm can be obtained from the following formula (4).

$$\theta_2 = \pi - \theta_1 = \pi - \sin^{-1}\left(\frac{2}{\pi}\right) \tag{3}$$

$$1 - \frac{\pi}{\pi - \sin^{-1}\left(\frac{2}{\pi}\right)} \tag{4}$$

Note that in the formula (3), $\theta_2$ is greater than π/2 and, specifically, is approximately 140°.

Thus, the light-emitting panel 101 can be folded so that the first support panel 111 faces the second support panel 112.

This embodiment can be combined with any of the other embodiments in this specification as appropriate.

(Embodiment 3)

In this embodiment, the structure of a hinge portion applicable to a light-emitting device 100E of one embodiment of the present invention is described with reference to FIGS. 6A to 6C.

FIG. 6A is a side view illustrating components included in a hinge portion applicable to a light-emitting device of one embodiment of the present invention.

FIG. 6B1 is a side view illustrating the structure of the hinge portion 120a formed with a combination of the components in FIG. 6A.

FIG. 6B2 is an assembly drawing showing the structure of the hinge portion 120a in a plane including a dashed line X1-X2 of FIG. 6B1.

FIG. 6B3 is an assembly drawing showing the structure of the hinge portion 120a in a plane including a dashed line Y1-Y2 of FIG. 6B1.

FIG. 6C is a side view illustrating a light-emitting device 100E in a folded state which includes the hinge portion illustrated in FIGS. 6B1 to 6B3.

The light-emitting device 100E described in this embodiment includes the first support panel 111, the second support panel 112, and the third support panel 113. Note that the first support panel 111, the second support panel 112, and the third support panel 113 each support the light-emitting panel 101 and extend toward the back side of the diagram (see FIG. 6C).

The hinge portion 120a connects the first support panel 111 and the second support panel 112 so that the light-emitting device 100E is foldable.

The hinge portion 120c connects the second support panel 112 and the third support panel 113 so that the light-emitting device 100E is foldable.

The hinge portion 120a includes a gear 11 which is pressed into the first support panel 111; a planet gear mechanism 13 which meshes with the gear 11; a gear 14 which meshes with the planet gear 13; and a gear 12 which meshes with the gear 14 and is pressed into the second support panel 112 (see FIG. 6A).

Furthermore, the hinge portion 120a includes the first arm 121 and the second arm 122. The first arm 121 is provided with a bearing for rotating the gear 11 about the first shaft 131. The second arm 122 is provided with a sun gear 143, a bearing 142, and a bearing 144. The third shaft 133 passes through the sun gear 143, and the sun gear 143 is included in the planet gear mechanism 13. Therefore, a planet gear of the planet gear mechanism 13 can be rotated about the third shaft 133. In addition, the bearing 144 is provided so that the gear 14 is rotated about a fourth shaft 134, and the bearing 142 is provided so that the gear 12 is rotated about the second shaft 132.

In addition, a distance L between the first shaft 131 and the third shaft 133 is set to $\pi \cdot R/4$, and the distance L between the first shaft 131 and one end portion of the first support panel 111 is set to $\pi \cdot R/4$. Note that a distance with which the light-emitting panel 101 is folded so that part of the light-emitting panel 101 is apart from another part thereof is R.

When the first support panel 111 is rotated about the first shaft 131 by an angle C1, the rotation of the gear 11 is transferred to the sun gear 143 of the planet gear mechanism 13, and the second arm 122 including the sun gear 143 is rotated about the third shaft by an angle C3.

Furthermore, when the first support panel 111 is rotated about the first shaft 131 by the angle C1, the rotation of the gear 11 is transferred to the gear 12 via the planet gear mechanism 13 and the gear 14, and the second support panel 112 into which the gear 12 is pressed is rotated about the second shaft by an angle C2.

The number of teeth of the gear 12 is equal to that of the gear 11. Accordingly, an angle by which the first arm 121 is rotated about the first shaft 131 can be equal to an angle by which the second arm 122 is rotated about the second shaft 132.

A planet gear mechanism in which the number of rotations of a sun gear is greater than or equal to 0.71 times and less than or equal to 0.73 times the number of rotations of an external tooth is used as the planet gear mechanism 13.

In this manner, the light-emitting panel 101 can be folded between the two support panels apart from each other, with a curvature radius of greater than R/2. Furthermore, the two support substrates supporting the light-emitting panel 101 can be developed at the same velocity. As a result, a foldable light-emitting device can be provided. Furthermore, a light-emitting device which can be developed can be provided.

This embodiment can be combined with any of the other embodiments in this specification as appropriate.

(Embodiment 4)

In this embodiment, structures of bendable light-emitting panels which are applicable to a light-emitting device of one embodiment of the present invention are described with reference to FIGS. 7A and 7B and FIGS. 8A and 8B. Note that the light-emitting device provided with a bendable light-emitting panel described in this embodiment can be used as a foldable lighting device.

Figure 7A:
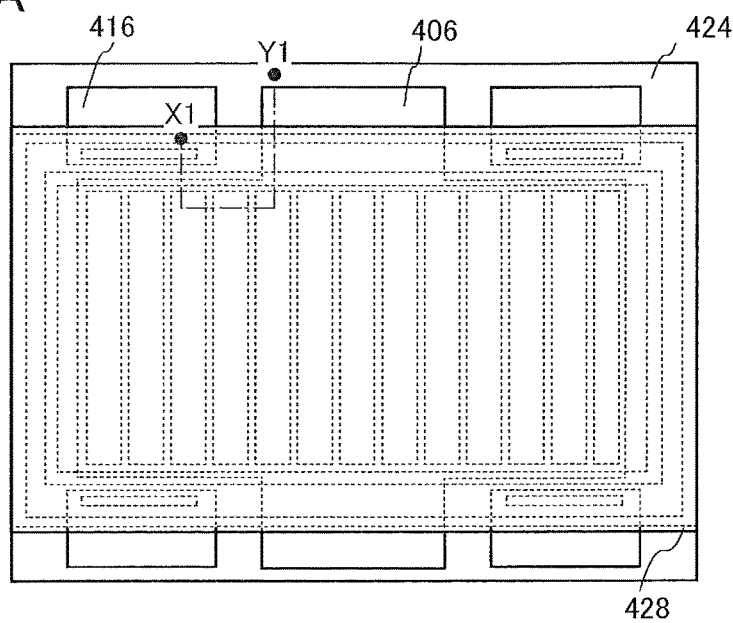
FIGS. 7A and 7B illustrate the structure of a light-emitting panel that can be used in a light-emitting device according to one embodiment.
Figure 7B:
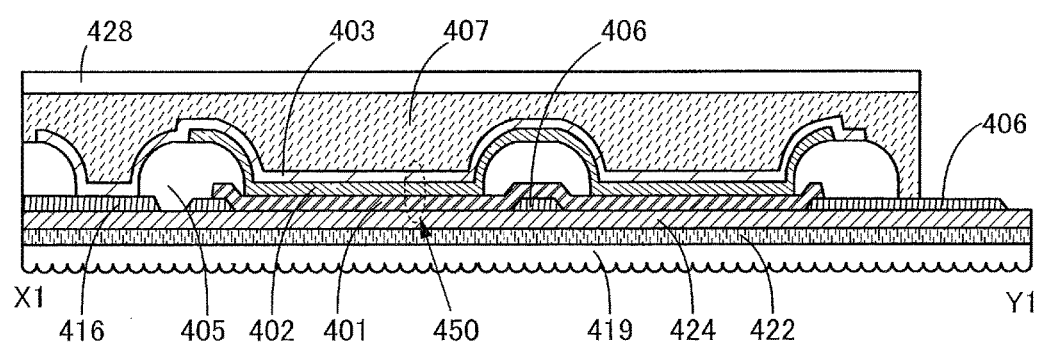

FIGS. 7A and 7B illustrate the structure of a light-emitting panel that can be used in a light-emitting device of one embodiment of the present invention.

<Structural Example 1>

FIG. 7A is a plan view of a light-emitting panel, and FIG. 7B is a cross-sectional view taken along dashed dotted line X1-Y1 in FIG. 7A. The light-emitting panel illustrated in FIGS. 7A and 7B is a bottom-emission light-emitting panel.

The light-emitting panel in FIG. 7B includes a flexible substrate 419, an adhesive layer 422, an insulating layer 424, a conductive layer 406, a conductive layer 416, a partition 405, a light-emitting element 450 (a first electrode 401, an EL layer 402, and a second electrode 403), an adhesive layer 407, and a flexible substrate 428.

The first electrode 401, the insulating layer 424, the adhesive layer 422, and the flexible substrate 419 transmit visible light.

The light-emitting element 450 is provided over the flexible substrate 419 with the adhesive layer 422 and the insulating layer 424 positioned therebetween. The light-emitting element 450 is sealed with the flexible substrate 419, the adhesive layer 407, and the flexible substrate 428.

The light-emitting element 450 includes the first electrode 401, the EL layer 402 over the first electrode 401, and the second electrode 403 over the EL layer 402. It is preferable that the second electrode 403 reflect visible light.

The end portions of the first electrode 401, the conductive layer 406, and the conductive layer 416 are covered with the partition 405.

The conductive layer 406 is electrically connected to the first electrode 401, and the conductive layer 416 is electrically connected to the second electrode 403. The conductive layer 406 is electrically connected to the first electrode 401 and serves as an auxiliary wiring. The auxiliary wiring inhibits a voltage drop due to electrical resistance of the electrode, and variation in light emission; therefore, the auxiliary wiring is preferably provided. Note that the conductive layer 406 may be provided over the first electrode 401. Furthermore, an auxiliary wiring which is electrically connected to the second electrode 403 may be provided, for example, over the partition 405.

To increase the light extraction efficiency of the light-emitting panel, a light extraction structure is preferably provided on a side from which light of the light-emitting element is extracted. FIG. 7B shows an example in which the flexible substrate 419 which has unevenness on the side from which the light of the light-emitting element is extracted also serves as the light extraction structure.

<Structural Example 2>

Figure 8A:
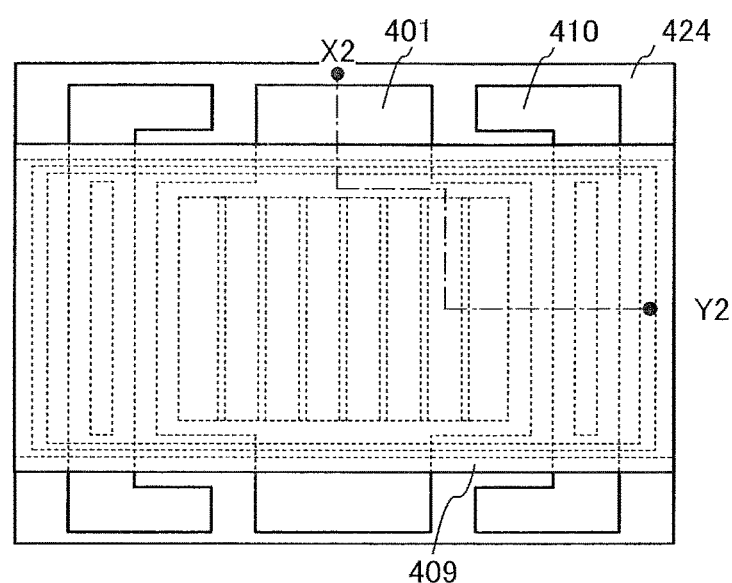
FIGS. 8A and 8B illustrate the structure of a light-emitting panel that can be used in a light-emitting device according to one embodiment.
Figure 8B:
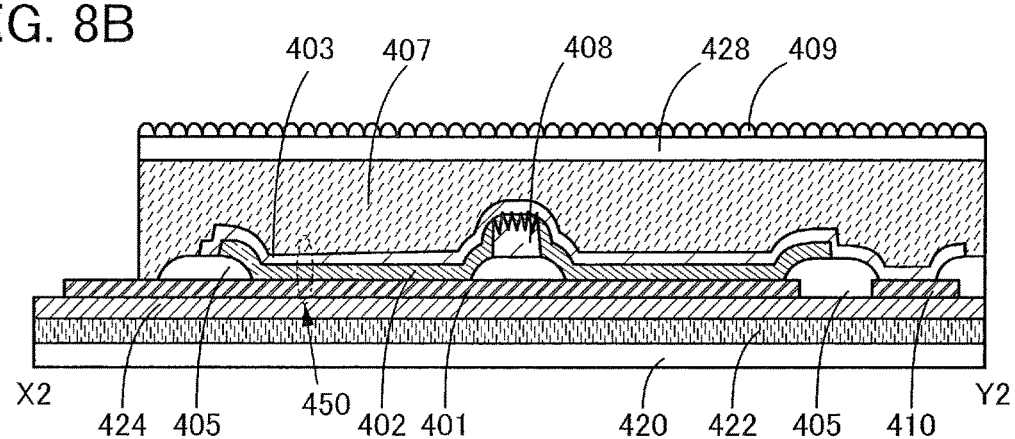

FIG. 8A is a plan view of a light-emitting panel, and FIG. 8B is a cross-sectional view taken along dashed dotted line X2-Y2 in FIG. 8A. The light-emitting panel illustrated in FIGS. 8A and 8B is a top-emission light-emitting panel.

The light-emitting panel in FIG. 8B includes a flexible substrate 420, the adhesive layer 422, the insulating layer 424, a conductive layer 408, the partition 405, the light-emitting element 450 (the first electrode 401, the EL layer 402, and the second electrode 403), a conductive layer 410, the adhesive layer 407, the flexible substrate 428, and a light extraction structure 409.

The second electrode 403, the adhesive layer 407, the flexible substrate 428, and the light extraction structure 409 transmit visible light.

The light-emitting element 450 is provided over the flexible substrate 420 with the adhesive layer 422 and the insulating layer 424 positioned therebetween. The light-emitting element 450 is sealed with the flexible substrate 420, the adhesive layer 407, and the flexible substrate 428.

The light-emitting element 450 includes the first electrode 401, the EL layer 402 over the first electrode 401, and the second electrode 403 over the EL layer 402. It is preferable that the first electrode 401 reflect visible light. The light extraction structure 409 is attached to the surface of the flexible substrate 428.

The end portions of the first electrode 401 and the conductive layer 410 are covered with the partition 405. The conductive layer 410 can be formed using the same process and material as those of the first electrode 401 and is electrically connected to the second electrode 403.

The conductive layer 408 over the partition 405 serves as an auxiliary wiring and is electrically connected to the second electrode 403. The conductive layer 408 is provided over the second electrode 403. Furthermore, in a manner similar to Structural example 1, an auxiliary wiring which is electrically connected to the first electrode 401 may be provided.

Components of the light-emitting panel described in this embodiment are described below.

<<Flexible Substrate>>

A flexible material is used for the flexible substrate. For example, an organic resin, a glass material that is thin enough to have flexibility, or the like can be used. In addition, a material which transmits visible light is used for the flexible substrate on the side from which emitted light is extracted. For the flexible substrate on the side from which emitted light is not extracted, a substrate which does not transmit light, for example, a metal substrate, may be used.

An organic resin, which has a specific gravity smaller than that of glass, is preferably used, in which case the light-emitting device can be more lightweight as compared with the case where glass is used.

Examples of such a material having flexibility and a light-transmitting property include polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, and a polyvinyl chloride resin. In particular, a material whose coefficient of thermal expansion is low is preferred, and for example, a polyamide imide resin, a polyimide resin, or PET can be suitably used. A substrate in which a fibrous body is impregnated with a resin (also referred to as prepreg) or a substrate whose coefficient of thermal expansion is reduced by mixing an organic resin with an inorganic filler can also be used.

A fiber of an organic compound or an inorganic compound may be contained in the flexible and light-transmitting material. For example, a fiber with a high tensile modulus of elasticity or high Young's modulus can be contained. Specifically, a polyvinyl alcohol fiber, a polyester fiber, a polyamide fiber, a polyethylene fiber, an aramid fiber, a polyparaphenylene benzobisoxazole fiber, a glass fiber, a carbon fiber, and the like can be given. As the glass fiber, glass fiber using E glass, S glass, D glass, Q glass, or the like can be used. These fibers may be used in a state of a woven fabric or a nonwoven fabric, and a structure in which this fibrous body is impregnated with a resin and the resin is cured may be used as the flexible substrate. When the structure including the fibrous body and the resin is used as the flexible substrate, reliability against bending or breaking due to local pressure can be increased, which is preferable.

It is preferable that the refractive index of the flexible and light-transmitting material be high because the high refractive index improves the light extraction efficiency. For example, a substrate obtained by dispersing an inorganic filler having a high refractive index into an organic resin can have a higher refractive index than the substrate formed of only the organic resin. In particular, an inorganic filler having a particle diameter as small as 40 nm or less is preferred, because such a filler can maintain optical transparency.

The thickness of the metal substrate is preferably set so that the metal substrate has flexibility. For example, the thickness is preferably greater than or equal to 10 μm and less than or equal to 200 μm, preferably greater than or equal to 20 μm and less than or equal to 50 μm. Since a metal substrate has a high thermal conductivity, heat generated due to light emission of the light-emitting element can be efficiently released.

There is no particular limitation on a material of the metal substrate, but it is preferable to use, for example, aluminum, copper, nickel, a metal alloy such as an aluminum alloy or stainless steel.

The flexible substrate may have a stacked structure of a layer of any of the above-mentioned materials and a hard coat layer (e.g., a silicon nitride layer) which protects a surface of the panel from damage or the like, a layer (e.g., an aramid resin layer) which can disperse pressure, or the like. Furthermore, to suppress a decrease in the lifetime of the light-emitting element (in particular, in the case of using an organic EL element or the like) due to moisture and the like, the insulating film with low water permeability may be included in the stacked structure.

The flexible substrate may be formed by stacking a plurality of layers. When a glass layer is used, a barrier property against water and oxygen can be improved and thus a reliable light-emitting panel can be provided.

A flexible substrate in which a glass layer, a bonding layer, and an organic resin layer are stacked from the side closer to a light-emitting element is preferably used. The thickness of the glass layer is greater than or equal to 20 μm and less than or equal to 200 μm, preferably greater than or equal to 25 μm and less than or equal to 100 μm. Such a thickness allows the glass layer to have both high flexibility and a high barrier property against water and oxygen. The thickness of the organic resin layer is greater than or equal to 10 μm and less than or equal to 200 μm, preferably greater than or equal to 20 μm and less than or equal to 50 μm. Providing such organic resin layer outside the glass layer, occurrence of a crack or a break in the glass layer can be suppressed and mechanical strength can be improved. With the substrate that includes such a composite material of a glass material and an organic resin, a highly reliable and flexible light-emitting panel can be provided.

<<Adhesive Layer>>

Any of a variety of curable adhesives, e.g., light curable adhesives such as a UV curable adhesive, a reactive curable adhesive, a thermal curable adhesive, and an anaerobic adhesive can be used for the adhesive layer. Examples of these adhesives include an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin. In particular, a material with low moisture permeability, such as an epoxy resin, is preferred. Alternatively, a two-component-mixture-type resin may be used. Further alternatively, an adhesive sheet or the like may be used.

Furthermore, the resin may include a drying agent. As the drying agent, for example, a substance which adsorbs moisture by chemical adsorption, such as an oxide of an alkaline earth metal (e.g., calcium oxide or barium oxide), can be used. Alternatively, a substance that adsorbs moisture by physical adsorption, such as zeolite or silica gel, may be used. The drying agent is preferably included because it can prevent an impurity such as moisture from entering the functional element, thereby improving the reliability of the light-emitting panel.

In addition, it is preferable to mix a filler with a high refractive index or light-scattering member into the resin, in which case the efficiency of light extraction from the light-emitting element can be improved. For example, titanium oxide, barium oxide, zeolite, zirconium, or the like can be used.

<<Insulating Layer>>

An insulating film having low water permeability (or low moisture permeability) is preferably used as the insulating layer 424. In addition, an insulating film having low water permeability may be formed between the adhesive layer 407 and the second electrode 403.

As an insulating film with low water permeability, a film containing nitrogen and silicon, such as a silicon nitride film or a silicon nitride oxide film, a film containing nitrogen and aluminum, such as an aluminum nitride film, or the like can be used. Alternatively, a silicon oxide film, a silicon oxynitride film, an aluminum oxide film, or the like can be used.

For example, the water vapor transmittance of the insulating film with low water permeability is lower than or equal to $1\times10^{-5}$ [g/m$^2$·day], preferably lower than or equal to $1\times10^{-6}$ [g/m$^2$·day], further preferably lower than or equal to $1\times10^{-7}$ [g/m$^2$·day], still further preferably lower than or equal to $1\times10^{-8}$ [g/m$^2$·day].

<<Light-Emitting Element>>

There is no particular limitation on the structure of the light-emitting element.

For example, the top-emission organic EL element, a bottom-emission organic EL element, or a dual-emission organic EL element can be used as the light-emitting element.

When a voltage higher than the threshold voltage of the organic EL element is applied between a pair of electrodes, holes are injected to the EL layer 402 from the anode side and electrons are injected to the EL layer 402 from the cathode side. The injected electrons and holes are recombined in the EL layer 402 and a light-emitting substance contained in the EL layer 402 emits light.

A conductive film that transmits visible light is used as the electrode through which light is extracted. A conductive film that reflects visible light is preferably used as the electrode through which light is not extracted.

The conductive film that transmits visible light can be formed using, for example, indium oxide, indium tin oxide (ITO), indium zinc oxide, zinc oxide, or zinc oxide to which gallium is added. Furthermore, for example, graphene, or a metal film which is thin enough to have a light-transmitting property can be used.

For example, a thin film of a metal material such as gold, silver, platinum, magnesium, nickel, tungsten, chromium, molybdenum, iron, cobalt, copper, palladium, or titanium; an alloy containing any of these metal materials; or a nitride of any of these metal materials (e.g., titanium nitride) can be formed. Alternatively, a stacked film which transmits visible light can be used as the conductive layer. For example, a stacked film in which an alloy of silver and magnesium is stacked on ITO is preferably used, in which case conductivity can be increased.

For the conductive film that reflects visible light, for example, a metal material, such as aluminum, gold, platinum, silver, nickel, tungsten, chromium, molybdenum, iron, cobalt, copper, or palladium or an alloy including any of these metal materials can be used. Lanthanum, neodymium, germanium, or the like may be added to the metal material or the alloy. Furthermore, an alloy containing aluminum (an aluminum alloy) such as an alloy of aluminum and titanium, an alloy of aluminum and nickel, or an alloy of aluminum and neodymium; or an alloy containing silver such as an alloy of silver and copper, an alloy of silver, copper, and palladium, or an alloy of silver and magnesium can be used for the conductive film. An alloy of silver and copper is preferable because of its high heat resistance. Moreover, a metal film or a metal oxide film is stacked on an aluminum alloy film, whereby oxidation of the aluminum alloy film can be suppressed. Examples of a material for the metal film or the metal oxide film are titanium and titanium oxide. Alternatively, the above conductive film that transmits visible light and a film containing a metal material may be stacked. For example, a stacked film of silver and ITO or a stacked film of an alloy of silver and magnesium and ITO can be used.

The above conductive films can be formed by an evaporation method, a sputtering method, a discharging method such as an inkjet method, a printing method such as a screen printing method, or a plating method.

The EL layer 402 includes at least a light-emitting layer. In addition to the light-emitting layer, the EL layer 402 may further include one or more layers containing any of a substance with a high hole-injection property, a substance with a high hole-transport property, a hole-blocking material, a substance with a high electron-transport property, a substance with a high electron-injection property, a substance with a bipolar property (a substance with a high electron- and hole-transport property), and the like.

For the EL layer 402, either a low molecular compound or a high molecular compound can be used, and an inorganic compound may also be used. The above-described layers included in the EL layer 402 can be formed separately by any of the following methods: an evaporation method (including a vacuum evaporation method), a transfer method, a printing method, an inkjet method, a coating method, and the like.

<<Partition>>

For the partition 405, an organic insulating material or an inorganic insulating material is used. As the resin, for example, a polyimide resin, a polyamide resin, an acrylic resin, a siloxane resin, an epoxy resin, a phenol resin, or the like can be used. It is particularly preferable that the partition be formed using a photosensitive resin material so that a sidewall of an opening has an inclined surface with continuous curvature.

There is no particular limitation to the method for forming the partition 405; a photolithography method, a sputtering method, an evaporation method, a droplet discharging method (e.g., an inkjet method), a printing method (e.g., a screen printing method or an off-set printing method), or the like may be used.

<<Conductive Layer>>

For example, the conductive layer functioning as a wiring, an auxiliary electrode of the light-emitting element, or the like can be formed to have a single-layer structure or a stacked-layer structure using any of metal materials such as molybdenum, titanium, chromium, tantalum, tungsten, aluminum, copper, neodymium, and scandium, and an alloy material containing any of these elements. Alternatively, the conductive layer may be formed using a conductive metal oxide. As the conductive metal oxide, indium oxide (e.g., $In_2O_3$), tin oxide (e.g., $SnO_2$), zinc oxide (ZnO), ITO, indium zinc oxide (e.g., $In_2O_3$—ZnO), or any of these metal oxide materials in which silicon oxide is contained can be used.

The thickness of the auxiliary wiring can be greater than or equal to 0.1 μm and less than or equal to 3 μm, preferably greater than or equal to 0.1 μm and less than or equal to 0.5 μm.

When a paste (e.g., silver paste) is used as a material for the auxiliary wiring, metal particles forming the auxiliary wiring aggregate; therefore, the surface of the auxiliary wiring is rough and has many gaps. Thus, it is difficult for the EL layer to completely cover the auxiliary electrode; accordingly, the upper electrode and the auxiliary wiring are electrically connected to each other easily, which is preferable.

<<Light Extraction Structure>>

For the light extraction structure, a hemispherical lens, a micro lens array, a film provided with an uneven surface structure, a light diffusing film, or the like can be used. For example, a light extraction structure can be formed by attaching the lens or film to the substrate with an adhesive or the like which has substantially the same refractive index as the substrate or the lens or film.

This embodiment can be combined with any of the other embodiments in this specification as appropriate.

(Embodiment 5)

In this embodiment, the structure of a foldable light-emitting panel that can be used in a light-emitting device of one embodiment of the present invention is described with reference to FIGS. 9A to 9C. Note that the light-emitting device provided a bendable light-emitting panel that is described in this embodiment can be used as a foldable display or an input/output device of an information processor.

Note that the light-emitting panel described in this embodiment includes a light-emitting element and an image sensor, and thus not only can function as a display panel displaying image data but also can be used as an information input unit. Therefore, the light-emitting panel is referred to as an input/output panel in this embodiment.

FIG. 9A is a top view illustrating the structure of an input/output device (light-emitting panel) that can be used in a light-emitting device of one embodiment of the present invention.

FIG. 9B is a cross-sectional view taken along line A-B and line C-D in FIG. 9A.

FIG. 9C is a cross-sectional view taken along line E-F in FIG. 9A.

<Top View>

An input/output device 300 described as an example in this embodiment includes a display portion 301 (see FIG. 9A).

The display portion 301 includes a plurality of pixels 302 and a plurality of imaging pixels 308. The imaging pixels 308 can sense a touch of a finger or the like on the display portion 301. Thus, a touch sensor can be formed using the imaging pixels 308.

Each of the pixels 302 includes a plurality of sub-pixels (e.g., a sub-pixel 302R). In addition, in the sub-pixels, light-emitting elements and pixel circuits that can supply electric power for driving the light-emitting elements are provided.

The pixel circuits are electrically connected to wirings through which selection signals are supplied and wirings through which image signals are supplied.

Furthermore, the input/output device 300 is provided with a scan line driver circuit 303g(1) that can supply selection signals to the pixels 302 and an image signal line driver circuit 303s(1) that can supply image signals to the pixels 302.

The imaging pixels 308 include photoelectric conversion elements and imaging pixel circuits that drive the photoelectric conversion elements.

The imaging pixel circuits are electrically connected to wirings through which control signals are supplied and wirings through which power supply potentials are supplied.

Examples of the control signals include a signal for selecting an imaging pixel circuit from which a recorded imaging signal is read, a signal for initializing an imaging pixel circuit, and a signal for determining the time it takes for an imaging pixel circuit to detect light.

The input/output device 300 is provided with an imaging pixel driver circuit 303g(2) that can supply control signals to the imaging pixels 308 and an imaging signal line driver circuit 303s(2) that reads out imaging signals.

<Cross-Sectional View>

The input/output device 300 includes a substrate 310 and a counter substrate 370 that faces the substrate 310 (see FIG. 9B).

The substrate 310 is a stacked body including a flexible substrate 310b, a barrier film 310a that prevents diffusion of unintentional impurities to the light-emitting elements, and an adhesive layer 310c that attaches the barrier film 310a to the substrate 310b.

The counter substrate 370 is a stacked body including a flexible substrate 370b, a barrier film 370a that prevents diffusion of unintentional impurities to the light-emitting elements, and an adhesive layer 370c that attaches the barrier film 370a to the substrate 370b (see FIG. 9B).

A sealant 360 attaches the counter substrate 370 to the substrate 310. The sealant 360 also serving as an optical adhesive layer has a refractive index higher than that of air. The pixel circuits and the light-emitting elements (e.g., a first light-emitting element 350R) are provided between the substrate 310 and the counter substrate 370.

<<Structure of Pixel>>

Each of the pixels 302 includes a sub-pixel 302R, a sub-pixel 302G, and a sub-pixel 302B (see FIG. 9C). The sub-pixel 302R includes a light-emitting module 380R, the sub-pixel 302G includes a light-emitting module 380G, and the sub-pixel 302B includes a light-emitting module 380B.

For example, the sub-pixel 302R includes the first light-emitting element 350R and the pixel circuit that can supply electric power to the first light-emitting element 350R and includes a transistor 302t (see FIG. 9B). Furthermore, the light-emitting module 380R includes the first light-emitting element 350R and an optical element (e.g., a first coloring layer 367R).

The first light-emitting element 350R includes a first lower electrode 351R, an upper electrode 352, and a layer 353 containing a light-emitting organic compound between the first lower electrode 351R and the upper electrode 352 (see FIG. 9C).

The layer 353 containing a light-emitting organic compound includes a light-emitting unit 353a, a light-emitting unit 353b, and an intermediate layer 354 between the light-emitting units 353a and 353b.

The light-emitting module 380R includes the first coloring layer 367R on the counter substrate 370. The coloring layer transmits light of a particular wavelength and is, for example, a layer that selectively transmits light of red, green, or blue color. A region that transmits light emitted from the light-emitting element as it is may be provided as well.

The light-emitting module 380R, for example, includes the sealant 360 that is in contact with the first light-emitting element 350R and the first coloring layer 367R.

The first coloring layer 367R is positioned in a region overlapping the first light-emitting element 350R. Accordingly, part of light emitted from the first light-emitting element 350R passes through the sealant 360 that also serves as an optical adhesive layer and through the first coloring layer 367R and is emitted to the outside of the light-emitting module 380R as indicated by arrows in the figure.

<<Structure of Display Panel>>

The input/output device 300 includes a light-blocking layer 367BM on the counter substrate 370. The light-blocking layer 367BM is provided so as to surround the coloring layer (e.g., the first coloring layer 367R).

The input/output device 300 includes an anti-reflective layer 367p positioned in a region overlapping the display portion 301. As the anti-reflective layer 367p, a circular polarizing plate can be used, for example.

The input/output device 300 includes an insulating film 321. The insulating film 321 covers the transistor 302t. Note that the insulating film 321 can be used as a layer for planarizing unevenness caused by the pixel circuits. An insulating film on which a layer that can prevent diffusion of impurities to the transistor 302t and the like is stacked can be used as the insulating film 321.

The input/output device 300 includes the light-emitting elements (e.g., the first light-emitting element 350R) over the insulating film 321.

The input/output device 300 includes, over the insulating film 321, a partition 328 that overlaps an end portion of the first lower electrode 351R (see FIG. 9C). In addition, a spacer 329 that controls the distance between the substrate 310 and the counter substrate 370 is provided on the partition 328.

<<Structure of Image Signal Line Driver Circuit>>

The image signal line driver circuit 303s(1) includes a transistor 303t and a capacitor 303c. Note that the driver circuit can be formed in the same process and over the same substrate as those of the pixel circuits.

<<Structure of Imaging Pixel>>

The imaging pixels 308 each include a photoelectric conversion element 308p and an imaging pixel circuit for sensing light received by the photoelectric conversion element 308p. The imaging pixel circuit includes a transistor 308t.

For example, a PIN photodiode can be used as the photoelectric conversion element 308p.

<<Other Structures>>

The input/output device 300 includes a wiring 311 through which a signal can be supplied. The wiring 311 is provided with a terminal 319. Note that an FPC 309(1) through which a signal such as an image signal or a synchronization signal can be supplied is electrically connected to the terminal 319.

Note that a printed wiring board (PWB) may be attached to the FPC 309(1).

This embodiment can be combined with any of the other embodiments in this specification as appropriate.

(Embodiment 6)

In this embodiment, a bendable light-emitting panel that is applicable to a light-emitting device of one embodiment of the present invention is described with reference to FIGS. 10A and 10B and FIG. 11.

Note that the light-emitting panel described in this embodiment can function as a display panel displaying image data but also can be used as an information input unit. Therefore, the light-emitting panel is referred to as a touch panel in this embodiment.

Figure 10A:
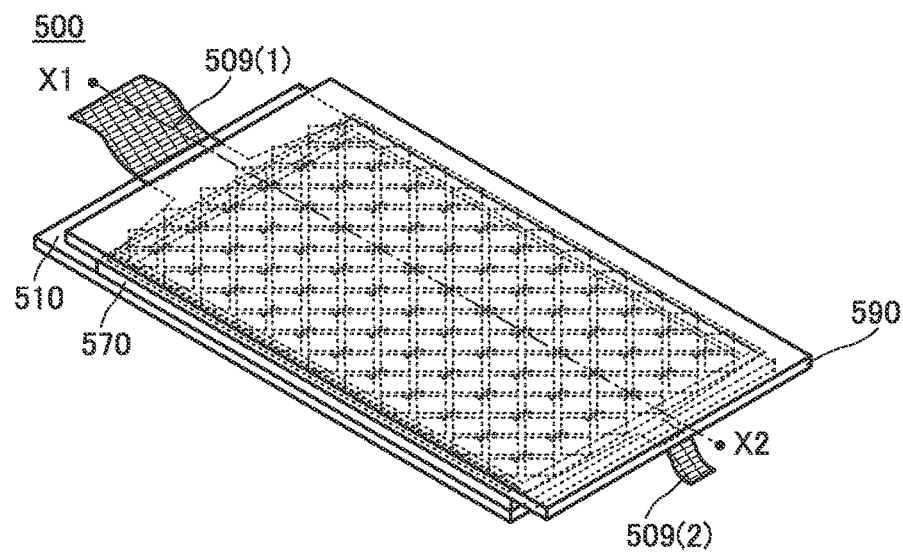
FIGS. 10A and 10B illustrate the structure of an input/output device that can be used for an information processor according to one embodiment.

FIG. 10A is a schematic perspective view of a touch panel 500 described in this embodiment. Note that FIGS. 10A and 10B illustrate only main components for simplicity. FIG. 10B is a developed view of the schematic perspective view of the touch panel 500.

Figure 11:
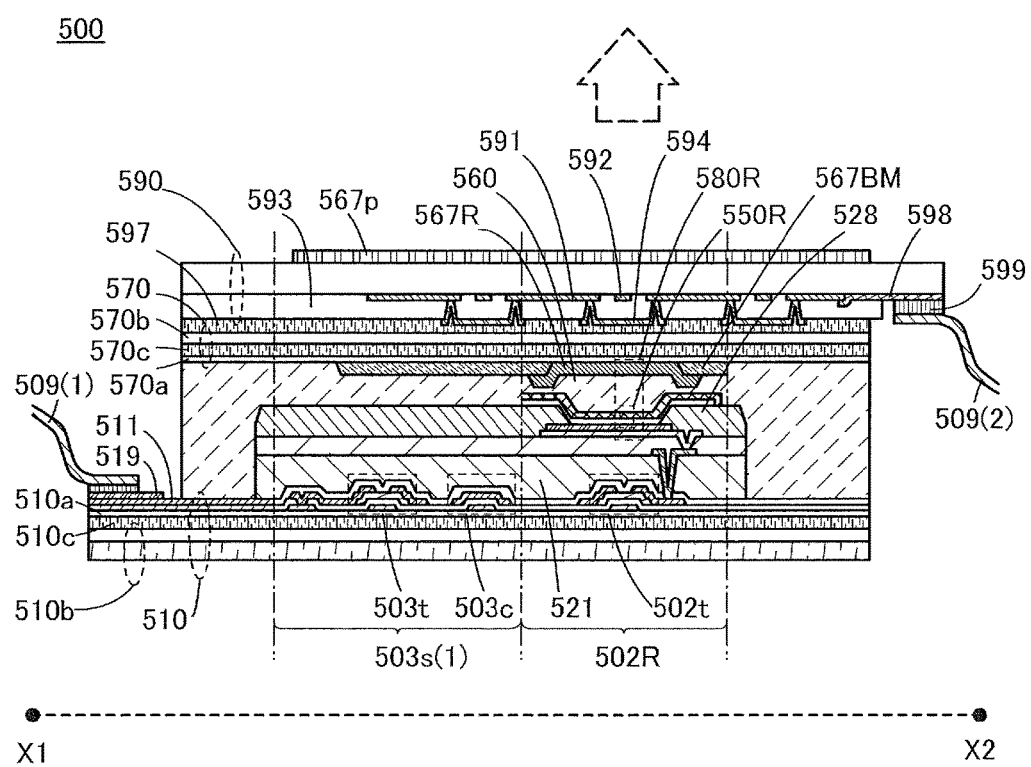
FIG. 11 illustrates the structure of an input/output device that can be used for an information processor according to one embodiment.

FIG. 11 is a cross-sectional view of the touch panel 500 taken along line X1-X2 in FIG. 10A.

Figure 10B:
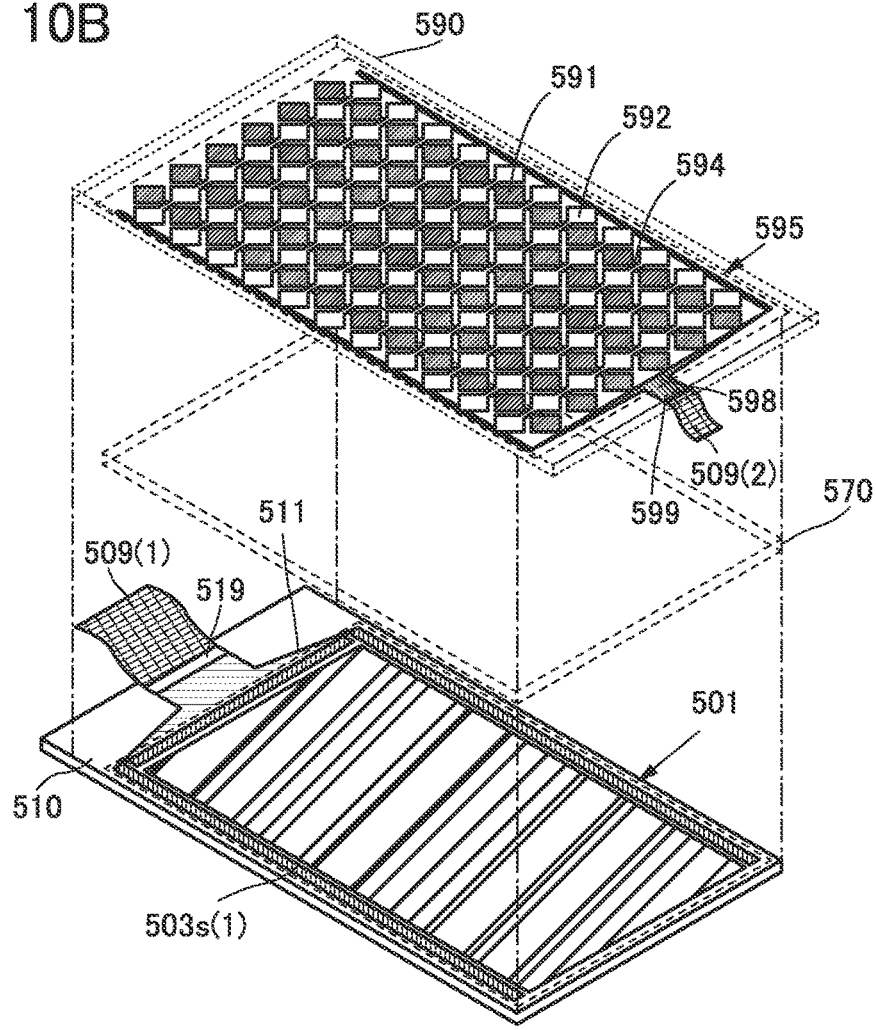

The touch panel 500 includes a display portion 501 and a touch sensor 595 (see FIG. 10B). Furthermore, the touch panel 500 includes a substrate 510, a substrate 570, and a substrate 590. Note that the substrate 510, the substrate 570, and the substrate 590 each have flexibility.

The display portion 501 includes the substrate 510, a plurality of pixels over the substrate 510, and a plurality of wirings 511 through which signals are supplied to the pixels. The plurality of wirings 511 is led to a peripheral portion of the substrate 510, and part of the plurality of wirings 511 forms a terminal 519. The terminal 519 is electrically connected to an FPC 509(1).

<Touch Sensor>

The substrate 590 includes the touch sensor 595 and a plurality of wirings 598 electrically connected to the touch sensor 595. The plurality of wirings 598 is led to a peripheral portion of the substrate 590, and part of the plurality of wirings 598 forms a terminal. The terminal is electrically connected to an FPC 509(2). Note that in FIG. 10B, electrodes, wirings, and the like of the touch sensor 595 provided on the back side of the substrate 590 (on the back side of the diagram) are indicated by solid lines for clarity.

As the touch sensor 595, a capacitive touch sensor can be used. Examples of the capacitive touch sensor are a surface capacitive touch sensor and a projected capacitive touch sensor.

Examples of the projected capacitive touch sensor are a self capacitive touch sensor and a mutual capacitive touch sensor, which differ mainly in the driving method. The use of a mutual capacitive type is preferable because multiple points can be sensed simultaneously.

An example of using a projected capacitive touch sensor is described below with reference to FIG. 10B.

Note that a variety of sensors that can sense the closeness or the contact of a sensing target such as a finger, can be used.

The projected capacitive touch sensor 595 includes electrodes 591 and electrodes 592. The electrodes 591 are electrically connected to any of the plurality of wirings 598, and the electrodes 592 are electrically connected to any of the other wirings 598.

The electrodes 592 each have a shape of a plurality of quadrangles arranged in one direction with one corner of a quadrangle connected to one corner of another quadrangle as illustrated in FIGS. 10A and 10B.

The electrodes 591 each have a quadrangular shape and are arranged in a direction intersecting with the direction in which the electrodes 592 extend.

A wiring 594 electrically connects two electrodes 591 between which the electrode 592 is positioned. The intersecting area of the electrode 592 and the wiring 594 is preferably as small as possible. Such a structure allows a reduction in the area of a region where the electrodes are not provided, reducing unevenness in transmittance. As a result, unevenness in luminance of light from the touch sensor 595 can be reduced.

Note that the shapes of the electrode 591 and the electrode 592 are not limited thereto and can be any of a variety of shapes. For example, a structure may be employed in which the plurality of electrodes 591 are arranged so that gaps between the electrodes 591 are reduced as much as possible, and the electrode 592 is spaced apart from the electrodes 591 with an insulating layer interposed therebetween to have regions not overlapping with the electrodes 591. In that case, a dummy electrode electrically insulated from these electrodes is preferably provided between two adjacent electrodes 592, in which case the area of regions having different transmittances can be reduced.

The structure of the touch sensor 595 is described with reference to FIG. 11.

The touch sensor 595 includes the substrate 590, the electrodes 591 and the electrodes 592 provided in a staggered arrangement on the substrate 590, an insulating layer 593 covering the electrodes 591 and the electrodes 592, and the wiring 594 that electrically connects the adjacent electrodes 591 to each other.

An adhesive layer 597 attaches the substrate 590 to the substrate 570 so that the touch sensor 595 overlaps the display portion 501.

The electrodes 591 and the electrodes 592 are formed using a light-transmitting conductive material. As a light-transmitting conductive material, a conductive oxide such as indium oxide, indium tin oxide, indium zinc oxide, zinc oxide, or zinc oxide to which gallium is added can be used.

The electrodes 591 and the electrodes 592 can be formed by depositing a light-transmitting conductive material on the substrate 590 by a sputtering method and then removing an unnecessary portion by any of various known patterning techniques such as photolithography.

The insulating layer 593 covers the electrodes 591 and the electrodes 592. Examples of a material for the insulating layer 593 are a resin such as an acrylic resin, an epoxy resin, and a resin having a siloxane bond and an inorganic insulating material such as silicon oxide, silicon oxynitride, and aluminum oxide.

Furthermore, openings reaching the electrodes 591 are formed in the insulating layer 593, and the wiring 594 electrically connects the adjacent electrodes 591. The wiring 594 is preferably formed using a light-transmitting conductive material, in which case the aperture ratio of the touch panel can be increased. Moreover, the wiring 594 is preferably formed using a material that has higher conductivity than those of the electrodes 591 and the electrodes 592.

One electrode 592 extends in one direction, and a plurality of electrodes 592 is provided in the form of stripes.

The wiring 594 intersects with the electrode 592.

Adjacent electrodes 591 are provided with one electrode 592 provided therebetween and are electrically connected by the wiring 594.

Note that the plurality of electrodes 591 is not necessarily arranged in the direction orthogonal to one electrode 592 and may be arranged to intersect with one electrode 592 at an angle of less than 90 degrees.

One wiring 598 is electrically connected to any of the electrodes 591 and 592. Part of the wiring 598 serves as a terminal. For the wiring 598, a metal material such as aluminum, gold, platinum, silver, nickel, titanium, tungsten, chromium, molybdenum, iron, cobalt, copper, or palladium or an alloy material containing any of these metal materials can be used.

Note that an insulating layer that covers the insulating layer 593 and the wiring 594 may be provided to protect the touch sensor 595.

Furthermore, a connection layer 599 electrically connects the wiring 598 to the FPC 509(2).

For the connection layer 599, an anisotropic conductive film (ACF), anisotropic conductive paste (ACP), or the like can be used.

The adhesive layer 597 has a light-transmitting property. For example, a thermosetting resin or an ultraviolet curable resin can be used; specifically, a resin such as an acrylic resin, an urethane resin, an epoxy resin, or a resin having a siloxane bond can be used.

<Display Portion>

The display portion 501 includes a plurality of pixels arranged in a matrix. Each of the pixels includes a display element and a pixel circuit for driving the display element.

In this embodiment, an example of using an organic electroluminescent element that emits white light as a display element is described; however, the display element is not limited to such element.

As the display element, for example, in addition to organic electroluminescent elements, any of a variety of display elements such as display elements (electronic ink) that perform display by an electrophoretic method, an electronic liquid powder method, or the like; MEMS shutter display elements; and optical interference type MEMS display elements can be used. Note that a pixel circuit structure suitable for display elements to be used can be selected from known pixel circuit structures.

The substrate 510 is a stacked body including a flexible substrate 510b, a barrier film 510a that prevents diffusion of unintentional impurities to the light-emitting elements, and an adhesive layer 510c that attaches the barrier film 510a to the substrate 510b.

The substrate 570 is a stacked body including a flexible substrate 570b, a barrier film 570a that prevents diffusion of unintentional impurities to the light-emitting elements, and an adhesive layer 570c that attaches the barrier film 570a to the substrate 570b.

A sealant 560 attaches the substrate 570 to the substrate 510. The sealant 560 also serving as an optical adhesive layer has a refractive index higher than that of air. The pixel circuits and the light-emitting elements (e.g., a first light-emitting element 550R) are provided between the substrate 510 and the substrate 570.

<<Structure of Pixel>>

A pixel includes the sub-pixel 502R, and the sub-pixel 502R includes a light-emitting module 580R.

The sub-pixel 502R includes the first light-emitting element 550R and the pixel circuit that can supply electric power to the first light-emitting element 550R and includes a transistor 502t. Furthermore, the light-emitting module 580R includes the first light-emitting element 550R and an optical element (e.g., a coloring layer 567R).

The light-emitting element 550R includes a lower electrode, an upper electrode overlapping the lower electrode, and a layer containing a light-emitting organic compound between the lower electrode and the upper electrode.

The light-emitting module 580R includes the first coloring layer 567R on the substrate 570. The coloring layer transmits light of a particular wavelength and is, for example, a layer that selectively transmits light of red, green, or blue color. A region that transmits light emitted from the light-emitting element as it is may be provided as well.

The light-emitting module 580R, for example, includes the sealant 560 that is in contact with the first light-emitting element 550R and the first coloring layer 567R.

Note that the first coloring layer 567R is positioned to overlap the first light-emitting element 550R. Accordingly, part of light emitted from the light-emitting element 550R passes through the sealant 560 serving as an optical adhesive layer and through the first coloring layer 567R and is emitted to the outside of the light-emitting module 580R as indicated by arrows in the figure.

<<Structure of Display Portion>>

In the display portion 501, the substrate 570 is provided with a light-blocking layer 567BM. The light-blocking layer 567BM is provided so as to surround the coloring layer (e.g., the first coloring layer 567R).

The display portion 501 includes an anti-reflective layer 567p positioned in a region overlapping pixels. As the anti-reflective layer 567p, for example, a circularly polarizing plate can be used.

The display portion 501 includes an insulating film 521. The insulating film 521 covers the transistor 502t. Note that the insulating film 521 can be used as a layer for planarizing unevenness due to the pixel circuit. An insulating film on which a layer that can prevent diffusion of impurities to the transistor 502t and the like is stacked can be used as the insulating film 521.

The display portion 501 includes the light-emitting elements (e.g., the first light-emitting element 550R) over the insulating film 521.

The display portion 501 includes, over the insulating film 521, a partition 528 that overlaps an end portion of the first lower electrode. In addition, a spacer that controls the distance between the substrate 510 and the substrate 570 is provided on the partition 528.

<<Structure of Image Signal Line Driver Circuit>

An image signal line driver circuit 503s(1) includes a transistor 503t and a capacitor 503c. Note that the driver circuit can be formed in the same process and over the same substrate as those of the pixel circuits.

<<Other Structures>>

The display portion 501 includes a wiring 511 that can supply a signal, and the terminal 519 is provided on the wiring 511. Note that the FPC 509(1) through which a signal such as an image signal or a synchronization signal can be supplied is electrically connected to the terminal 519.

Note that a printed wiring board (PWB) may be attached to the FPC 509(1).

This embodiment can be combined with any of the other embodiments in this specification as appropriate

EXPLANATION OF REFERENCE

100: light-emitting device; 100B: light-emitting device; 100C: light-emitting device; 100D: light-emitting device; 100E: light-emitting device; 101: light-emitting panel; 111: support panel; 111C: support panel; 112: support panel; 112C: support panel; 113: support panel; 120a: hinge portion; 120b: hinge portion; 120c: hinge portion; 120d: hinge portion; 121: first arm; 121B: first arm; 122: second arm; 122B: second arm; 123: third arm; 124: fourth arm; 131: first shaft; 131c: fourth shaft; 132: second shaft; 132c: fifth shaft; 133: third shaft; 133c: sixth shaft; 134: fourth shaft; 300: input/output device; 301: display portion; 302: pixel; 302B: sub-pixel; 302G: sub-pixel; 302R: sub-pixel; 302t: transistor; 303c: capacitor; 303g(1): scan line driver circuit; 303g(2): imaging pixel driver circuit; 303s(1): image signal line driver circuit; 303s(2): imaging signal line driver circuit; 303t: transistor; 308: image sensor; 308p: photoelectric conversion element; 308t: transistor, 309: FPC; 310: substrate; 310a: barrier film; 310b: substrate; 310c: adhesive layer; 311: wiring; 319: terminal; 321: insulating film; 328: partition; 329: spacer, 350R: light-emitting element; 351R: lower electrode; 352: upper electrode; 353: layer; 353a: light-emitting unit; 353b: light-emitting unit; 354: intermediate layer; 360: sealant; 367BM: light-blocking layer; 367p: anti-reflective layer; 367R: coloring layer; 370: counter substrate; 370a: barrier film; 370b: substrate; 370c: adhesive layer, 380B: light-emitting module; 380G: light-emitting module; 380R: light-emitting module; 401: electrode; 402: EL layer; 403: electrode; 405: partition; 406: conductive layer; 407: adhesive layer; 408: conductive layer; 409: structure; 410: conductive layer, 416: conductive layer; 419: flexible substrate; 420: flexible substrate; 422: adhesive layer; 424: insulating layer. 428: flexible substrate; 450: light-emitting element; 500: touch panel; 501: display portion; 502R: sub-pixel; 502t: transistor; 503c: capacitor; 503s: image signal line driver circuit; 503t: transistor; 509: FPC; 510: substrate; 510a: barrier film; 510b: substrate; 510c: adhesive layer; 511: wiring; 519: terminal; 521: insulating film; 528: partition; 550R: light-emitting element; 560: sealant; 567BM: light-blocking layer; 567p: anti-reflective layer; 567R: coloring layer; 570: substrate; 570a: barrier film; 570b: substrate; 570c: adhesive layer; 580R: light-emitting module; 590: substrate; 591: electrode; 592: electrode; 593: insulating layer, 594: wiring; 595: touch sensor; 597: adhesive layer; 598: wiring; 599: connection layer.

This application is based on Japanese Patent Application serial no. 2013-151317 filed with Japan Patent Office on Jul. 22, 2013, the entire contents of which are hereby incorporated by reference.

The invention claimed is:

1. A display device comprising:
a light-emitting panel having flexibility;
a first support panel supporting a first part of the light-emitting panel;
a second support panel supporting a second part of the light-emitting panel; and
a hinge portion connecting the first support panel with the second support panel so that the display device is foldable,
wherein the hinge portion comprises:
a first arm which is rotated about a first shaft connected to the first support panel;

a second arm which is rotated about a second shaft connected to the second support panel; and a third shaft which connects the first arm with the second arm, wherein the first arm is rotated about the first shaft at an angular velocity of ω, wherein the second arm is rotated about the second shaft at an angular velocity of −ω and rotated about the third shaft at an angular velocity of greater than or equal to 2.4ω and less than or equal to 2.6ω, and wherein in a folded state of the display device, a space is provided between the first part of the light-emitting panel and the second part of the light-emitting panel.

2. The display device according to claim 1, wherein in the folded state, a distance from the first shaft to the second shaft is R, and wherein a curvature radius of the light-emitting panel is greater than R/2.

3. The display device according to claim 1, wherein a distance from the first shaft to the third shaft is substantially equal to a distance from the second shaft to the third shaft.

4. The display device according to claim 1, wherein in an opened state of the display device, a distance from the first shaft to the third shaft, a distance from the second shaft to the third shaft, a distance from the first shaft to one end portion of the first support panel, and a distance from the second shaft to one end portion of the second support panel are substantially equal to one another.

5. The display device according to claim 1, wherein the hinge portion is a first hinge portion, and wherein a second hinge portion is further included in the display device.

6. The display device according to claim 1, wherein the first support panel comprises a first member and a second member with the first part of the light-emitting panel interposed therebetween, and wherein the second support panel comprises a third member and a fourth member with the second part of the light-emitting panel interposed therebetween.

7. A display device comprising:

a light-emitting panel having flexibility;

a first support panel supporting a first part of the light-emitting panel;

a second support panel supporting a second part of the light-emitting panel;

a third support panel supporting a third part of the light-emitting panel;

a first hinge portion and a second hinge portion connecting the first support panel with the second support panel so that the display device is foldable; and a third hinge portion and a fourth hinge portion connecting the second support panel and the third support panel so that the display device is foldable, wherein the first hinge portion and the second hinge portion each comprise:

a first arm which is rotated about a first shaft connected to the first support panel;

a second arm which is rotated about a second shaft connected to the second support panel; and a third shaft which connects the first arm with the second arm, wherein the third hinge portion and the fourth hinge portion each comprise:

a third arm which is rotated about a fourth shaft connected to the second support panel;

a fourth arm which is rotated about a fifth shaft connected to the third support panel; and a sixth shaft which connects the third arm with the fourth arm, wherein the first arm is rotated about the first shaft at an angular velocity of ω, wherein the second arm is rotated about the second shaft at an angular velocity of −ω and rotated about the third shaft at an angular velocity of greater than or equal to 2.4ω and less than or equal to 2.6ω, wherein in a folded state of the display device, a first space is provided between the first part of the light-emitting panel and the second part of the light-emitting panel, and wherein in the folded state, a second space is provided between the second part of the light-emitting panel and the third part of the light-emitting panel.

8. The display device according to claim 7, wherein in the folded state, a distance from the first shaft to the second shaft or a distance from the fourth shaft to the fifth shaft is R, and wherein a curvature radius of the light-emitting panel is greater than R/2.

9. The display device according to claim 7, wherein a distance from the first shaft to the third shaft is substantially equal to a distance from the second shaft to the third shaft.

10. The display device according to claim 7, wherein in an opened state of the display device, a distance from the first shaft to the third shaft, a distance from the second shaft to the third shaft, a distance from the first shaft to one end portion of the first support panel, and a distance from the second shaft to one end portion of the second support panel are substantially equal to one another.

11. The display device according to claim 7, wherein the first support panel comprises a first member and a second member with the first part of the light-emitting panel interposed therebetween, wherein the second support panel comprises a third member and a fourth member with the second part of the light-emitting panel interposed therebetween, and wherein the third support panel comprises a fifth member and a sixth member with the third part of the light-emitting panel interposed therebetween.

12. A display device comprising:

a display panel having flexibility;

a first support panel supporting a first part of the display panel;

a second support panel supporting a second part of the display panel; and a hinge portion connecting the first support panel with the second support panel so that the display device is foldable, wherein the hinge portion comprises:

a first arm which is rotated about a first shaft connected to the first support panel;

a second arm which is rotated about a second shaft connected to the second support panel; and a third shaft which connects the first arm with the second arm, wherein the first arm is rotated about the first shaft at an angular velocity of ω, wherein the second arm is rotated about the second shaft at an angular velocity of −ω and rotated about the third shaft at an angular velocity of greater than or equal to 0.71ω and less than or equal to 0.73ω, and wherein in a folded state of the display device, a space is provided between the first part of the display panel and the second part of the display panel.

13. The display device according to claim 12,
wherein in the folded state, a distance from the first shaft to the second shaft is R, and
wherein a curvature radius of the display panel is greater than R/2.

14. The display device according to claim 12, wherein a distance from the first shaft to the third shaft is substantially equal to a distance from the second shaft to the third shaft.

15. The display device according to claim 12,
wherein in an opened state of the display device, a distance from the first shaft to the third shaft, a distance from the second shaft to the third shaft, a distance from the first shaft to one end portion of the first support panel, and a distance from the second shaft to one end portion of the second support panel are substantially equal to one another.

16. The display device according to claim 12,
wherein the hinge portion is a first hinge portion, and
wherein a second hinge portion is further included in the display device.

17. The display device according to claim 12,
wherein the first support panel comprises a first member and a second member with the first part of the light-emitting panel interposed therebetween, and
wherein the second support panel comprises a third member and a fourth member with the second part of the light-emitting panel interposed therebetween.

* * * * *